United States Patent
Midori et al.

(10) Patent No.: US 12,436,178 B2
(45) Date of Patent: Oct. 7, 2025

(54) COMPUTER-READABLE MEDIUM, INFORMATION PROCESSING METHOD, AND INFORMATION PROCESSING DEVICE

(71) Applicant: TDK CORPORATION, Tokyo (JP)

(72) Inventors: Masataka Midori, Tokyo (JP); Tomohiro Honya, Tokyo (JP); Hiroshi Kurihara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 177 days.

(21) Appl. No.: 18/239,452

(22) Filed: Aug. 29, 2023

(65) Prior Publication Data

US 2024/0110962 A1 Apr. 4, 2024

(30) Foreign Application Priority Data

Sep. 26, 2022 (JP) .................................. 2022-152756

(51) Int. Cl.
*G01R 29/08* (2006.01)

(52) U.S. Cl.
CPC ..... *G01R 29/0892* (2013.01); *G01R 29/0878* (2013.01)

(58) Field of Classification Search
CPC ............ G01R 29/0892; G01R 29/0878; G01R 29/0821
USPC .......................................................... 324/95
See application file for complete search history.

(56) References Cited

U.S. PATENT DOCUMENTS

| | | | | |
|---|---|---|---|---|
| 4,201,987 A * | 5/1980 | Tricoles | ................. | G01R 29/10 343/703 |
| 5,920,390 A * | 7/1999 | Farahi | ................ | G01B 9/02091 356/477 |
| 6,411,104 B1 * | 6/2002 | Uesaka | .............. | G01R 29/0814 324/633 |
| 8,188,928 B2 * | 5/2012 | Lin | ...................... | H01Q 15/008 343/909 |
| 2006/0271891 A1 * | 11/2006 | Rautio | .................. | G06F 30/398 716/111 |
| 2007/0024293 A1 * | 2/2007 | Kosaka | ................ | G01R 31/001 324/754.21 |
| 2010/0271262 A1 * | 10/2010 | Eibert | .................... | G01R 29/10 342/360 |

(Continued)

FOREIGN PATENT DOCUMENTS

| | | |
|---|---|---|
| JP | 2017-181104 A | 10/2017 |
| JP | 2020-159905 A | 10/2020 |

*Primary Examiner* — Christopher P McAndrew
(74) *Attorney, Agent, or Firm* — Oliff PLC

(57) ABSTRACT

A computer-readable medium capable of estimating a distribution of an electromagnetic field intensity of radiant interference waves on a virtual surface surrounding a test piece with high accuracy while inhibiting an increase of a time required for a radiant interference wave test for radiant interference waves having a frequency included in a wider frequency band is provided. A computer-readable medium storing instructions which, when executed by a computer, cause the computer to execute a first calculation step of calculating an upper limit value of a measurement interval of radiant interference waves using an antenna based on positions of a plurality of electromagnetic wave sources according to a test piece radiating the radiant interference waves and a relative positional relation between the antenna measuring the radiant interference waves and the test piece.

15 Claims, 11 Drawing Sheets

(56) References Cited

U.S. PATENT DOCUMENTS

| | | | |
|---|---|---|---|
| 2011/0075127 A1* | 3/2011 | Nishina | G01N 21/3581 |
| | | | 356/51 |
| 2013/0249762 A1* | 9/2013 | Grelier | H01Q 19/10 |
| | | | 343/912 |
| 2014/0136134 A1* | 5/2014 | Oh | G01R 29/0814 |
| | | | 702/66 |
| 2017/0276712 A1* | 9/2017 | Midori | G01R 29/0892 |
| 2019/0369209 A1* | 12/2019 | Vermeulen | G01S 7/40 |
| 2020/0119460 A1* | 4/2020 | Maruo | H01Q 3/18 |
| 2020/0348410 A1* | 11/2020 | Smith | G01S 7/411 |
| 2021/0302484 A1* | 9/2021 | Rowell | G01R 29/0892 |
| 2021/0333314 A1* | 10/2021 | Piper | G01C 21/20 |
| 2022/0155358 A1 | 5/2022 | Honya et al. | |

* cited by examiner

COMPUTER-READABLE MEDIUM, INFORMATION PROCESSING METHOD, AND INFORMATION PROCESSING DEVICE

BACKGROUND OF THE INVENTION

Field of the Invention

The present disclosure relates to a computer-readable medium, an information processing method, and an information processing device.

Priority is claimed on Japanese Patent Application No. 2022-152756, filed Sep. 26, 2022, the content of which is incorporated herein by reference.

Description of Related Art

Technologies used for performing radiant interference wave tests have been researched and developed. Here, a radiant interference wave test is a test in which a field intensity of electromagnetic waves radiated as radiant interference waves from a test piece is set as a measurement target field intensity, and it is checked whether or not the measurement target field intensity is equal to or lower than an allowed value of international standards. A test piece is an object that becomes a target for which a radiant interference wave test is performed. In addition, a test piece is an object including an electromagnetic wave source radiating radiant interference waves. For example, a test piece is an electronic device. In a case in which a test piece is an electronic device, a radiant interference wave test is frequently performed before the electronic device is released onto the market. The reason for this is that there are cases in which radiant interference waves radiated from an electronic device have an influence on other electronic devices disposed in the vicinity thereof, and, for example, erroneous operations of the other electronic devices may be induced.

In a radiant interference wave test, a distribution of a measurement target field intensity on a measurement surface determined in advance is estimated as a measurement target field intensity distribution. The measurement surface is a virtual surface surrounding a test piece. After the measurement target field intensity distribution is estimated, in a radiant interference wave test, based on the estimated measurement target field intensity distribution, a position at which a measurement target field intensity is a maximum is identified as a maximum field intensity position. After the maximum field intensity position is identified, in the radiant interference wave test, at the identified maximum field intensity position, the measurement target field intensity is measured for a predetermined time. Then, after the measurement target field intensity is measured at the maximum field intensity position for the predetermined time, in the radiant interference wave test, it is checked whether or not a peak-to-peak value, an integrated value, an average value, and the like of the measurement target field intensity measured at the maximum field intensity position for the predetermined time are equal to or less than allowed values of international standards.

Here, in a radiant interference wave test, when the measurement target field intensity distribution is estimated, a plurality of measurement points are set on the measurement surface. Then, in the radiant interference wave test, a position of each of the plurality of measurement points set on the measurement surface is set as a measurement position, and a measurement target field intensity is measured at each measurement position. Then, in the radiant interference wave test, the measurement target field intensity distribution is estimated based on the measurement target field intensity measured at each measurement position. An estimation accuracy of the measurement target field intensity distribution estimated by the radiant interference wave test is represented using a degree of coincidence between a maximum field intensity position in the estimated measurement target field intensity distribution and an actual maximum field intensity position at which a measurement target field intensity in an actual measurement target field intensity distribution becomes a maximum. For this reason, a height of an estimation accuracy of the measurement target field intensity distribution represents a height of a identification accuracy of the maximum field intensity position.

In this way, in a radiant interference wave test, the measurement target field intensity is measured at each measurement position. For this reason, in a radiant interference wave test, the greater the number of a plurality of measurement points set on the measurement surface, the higher the estimation accuracy of the measurement target field intensity distribution. However, the greater the number of measurement points set on the measurement surface, the longer a time required for estimating the measurement target field intensity distribution becomes.

For example, in a radiant interference wave test for radiant interference waves of a frequency band of an information communication device (in other words, 30 MHz to 40 GHz), the shape of a measurement surface is a cylindrical shape. In this radiant interference wave test, a plurality of measurement points set on a measurement surface are set to be aligned with intervals of 1 cm in a vertical direction on the measurement surface of a cylindrical shape in the range of a height from a reference plane of 1 m to 4 m. In addition, in this radiant interference wave test, the plurality of measurement points set on a measurement surface are set to be aligned with intervals of 1° in a circumferential direction on the measurement surface having a cylindrical shape in the range of an azimuth angle around a center axis of the measurement surface having the cylindrical shape of 0 degrees to 360 degrees. For this reason, in this radiant interference wave test, the number of measurement points set on the measurement surface reaches about 140,000. As a result, in this radiant interference wave test, for example, even when measurement for one minute is performed for every one measurement point, a time equal to or longer than 140,000 minutes (about 97 days) is required.

In addition, in a radiant interference wave test, in order to improve estimation accuracy of the measurement target field intensity distribution, it is required to broaden a frequency band of electromagnetic waves to be measured as radiant interference waves. For this reason, in a radiant interference wave test, for example, by using a spectrum analyzer such as a super-heterodyne type spectrum analyzer or a FFT (Fast Fourier Transform) type spectrum analyzer, the spectrum of these electromagnetic waves is measured. However, it is also known that the wider the frequency band of the electromagnetic waves, the longer a time required for a radiant interference wave test.

In this way, in a radiant interference wave test, in a case in which the estimation accuracy of the measurement target field intensity distribution is desired to be raised, a time required for the radiant interference test may become long.

Here, for the purpose of inhibition of an increase of a time required for such a radiant interference wave test, a radiant interference wave measuring device including an electromagnetic wave measurement point calculating device that calculates a plurality of measurement positions on a measurement surface based on a sampling theorem and performing a radiant interference wave test based on the plurality of measurement positions calculated by the electromagnetic wave measurement point calculating device is known (see Patent Documents 1 and 2).

PATENT DOCUMENTS

[Patent Document 1] Japanese Unexamined Patent Application, First Publication No. 2017-181104
[Patent Document 2] Japanese Unexamined Patent Application, First Publication No. 2020-159905

SUMMARY OF THE INVENTION

Each of the radiant interference wave measuring devices described in Patent Documents 1 and 2, in a case in which a certain measurement position Y1 is given, calculates a measurement interval based on a sampling theorem by setting the interval from the measurement position Y1 to a next measurement position Y2 as a measurement interval. Then, this radiant interference wave measuring device calculates the measurement position Y2 based on the calculated measurement interval and the measurement position Y1. This radiant interference wave measuring device performs calculation of such a measurement position for each measurement position sequentially at each time and identifies arrangement of a plurality of measurement positions on a measurement surface, that is, arrangement of a plurality of measurement points set on the measurement surface based on a plurality of measurement positions that have been calculated. In accordance with this, this radiant interference wave measuring device can estimate a measurement target field intensity distribution with high accuracy without unnecessarily increasing the number of set measurement points.

However, when the distance between a test piece and a measurement point is close to or equal to or less than a wavelength of radiant interference waves, the worse measurement accuracy of the measurement target field intensity distribution to be measured may become.

The present disclosure is in consideration of such situations, and an object thereof is to provide a computer-readable medium, an information processing method, and an information processing device capable of estimating a distribution of an electromagnetic field intensity of radiant interference waves on a virtual surface surrounding a test piece with high accuracy while inhibiting an increase of a time required for a radiant interference wave test for radiant interference waves having a frequency included in a wider frequency band.

One aspect of the present disclosure is a computer-readable medium storing instructions which, when executed by a computer, cause the computer to execute a first calculation step of calculating an upper limit value of a measurement interval of radiant interference waves using an antenna based on positions of a plurality of electromagnetic wave sources according to a test piece radiating the radiant interference waves and a relative positional relation between the antenna measuring the radiant interference waves and the test piece.

In addition, one aspect of the present disclosure is an information processing method including a first calculation step of calculating an upper limit value of a measurement interval of radiant interference waves using an antenna based on positions of a plurality of electromagnetic wave sources according to a test piece radiating the radiant interference waves and a relative positional relation between the antenna measuring the radiant interference waves and the test piece.

Furthermore, one aspect of the present disclosure is an information processing device that calculates an upper limit value of a measurement interval of radiant interference waves using an antenna based on positions of a plurality of electromagnetic wave sources according to a test piece radiating the radiant interference waves and a relative positional relation between the antenna measuring the radiant interference waves and the test piece.

BRIEF DESCRIPTION OF THE DRAWINGS

FIG. 14 is a diagram for comparing a measurement target field intensity distribution estimated in the process of the flowchart illustrated in FIG. 13 based on a certain measurement condition and an actual measurement target field intensity distribution estimated based on this measurement condition, a simulation based on electromagnetics, and the like.

DETAILED DESCRIPTION OF THE INVENTION

Embodiment

Hereinafter, an embodiment of the present disclosure will be described with reference to the drawings.
<Configuration of Radiant Interference Wave Measuring Device>

Figure 1:
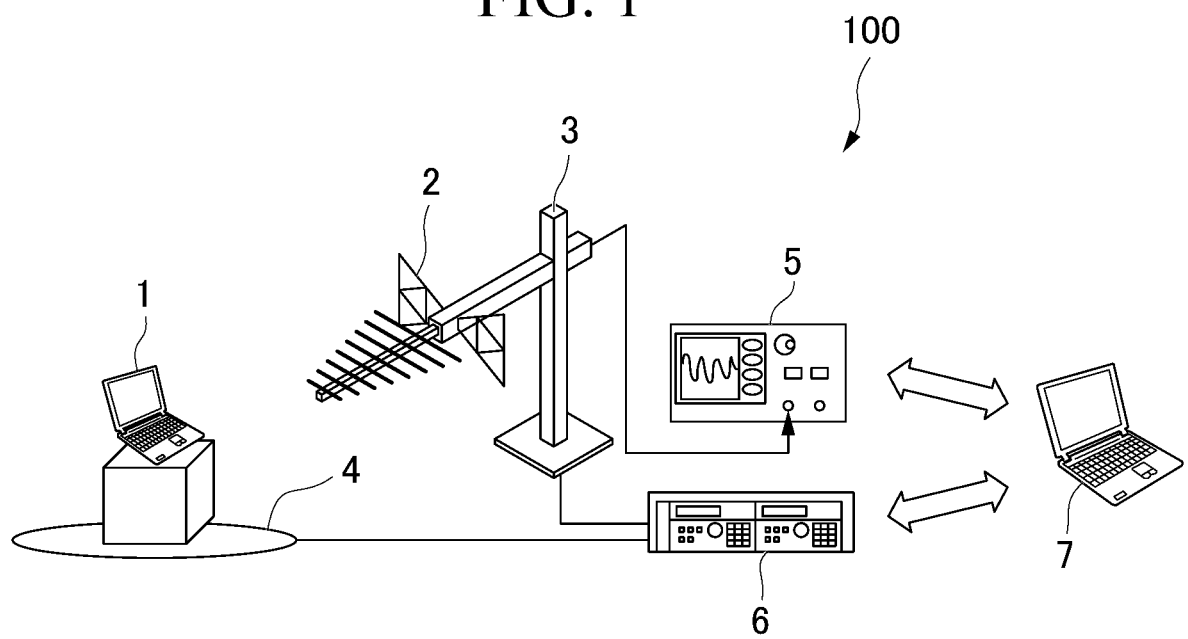
FIG. 1 is a diagram illustrating an example of the configuration of a radiant interference wave measuring device 100 according to an embodiment.

Hereinafter, the configuration of a radiant interference wave measuring device 100 according to an embodiment will be described with reference to FIG. 1. FIG. 1 is a diagram illustrating an example of the configuration of the radiant interference wave measuring device 100 according to the embodiment.

The radiant interference wave measuring device 100 is a device that performs a radiant interference wave test. The radiant interference wave test is a test for measuring radiant interference waves radiated from a test piece in compliance with electromagnetic compatibility (EMC) standards. Accordingly, test conditions and a test method of the radiant interference wave test are internationally set. In addition, the radiant interference wave test is a test of measuring at least one of an electric field intensity of radiant interference waves and a magnetic field intensity of radiant interference waves as measurement of the radiant interference waves. Hereinafter, as one example, a case in which a radiant interference wave test is a test for performing measurement of an electric field intensity of radiant interference waves will be described. In addition, hereinafter, for convenience of description, an electric field intensity of radiant interference waves measured by the radiant interference wave measuring device 100 in a radiant interference wave test will be referred to as a measurement target field intensity.

Here, a test piece is an object that includes an electromagnetic wave source radiating radiant interference waves. In addition, the test piece is an object that is a target of a radiant interference wave test (that is, a subject of a radiant interference wave test). In addition, the radiant interference waves are electromagnetic waves of a predetermined frequency band from among electromagnetic waves radiated from the test piece. Hereinafter, as one example, a case in which such a test piece is a test piece 1 illustrated in FIG. 1 will be described. In this case, the radiant interference wave measuring device 100 performs a radiant interference wave test for measuring radiant interference waves radiated from the test piece 1. Thus, hereinafter, for convenience of description, radiant interference waves radiated from the test piece 1 will be simply referred to as radiant interference waves in the description. In this example, the test piece 1 is a notebook personal computer (PC). In addition, instead of the notebook PC, the test piece 1 may be another electronic device radiating electromagnetic waves, a communication device, or the like.

The radiant interference wave measuring device 100 is disposed inside an anechoic chamber including a metallic floor surface forming a ground plane. On the ground plane, a wave absorber may be installed, or no wave absorber may be installed. The wave absorber is produced using a material that absorbs radiant interference waves, for example, a magnetic material, carbon, or the like. In addition, no wave absorber may be attached to wall faces other than the metallic floor surface among inner walls of the anechoic chamber, or a wave absorber may be attached thereto. Hereinafter, as one example, a case in which no wave absorber is installed on the ground plane will be described. In addition, hereinafter, as one example, a case in which no wave absorber is attached to these wall faces will be described.

The radiant interference wave measuring device 100 includes an antenna 2, an antenna mast 3, a turn table 4, a receiver 5, a controller 6, and a computer 7. In addition, the radiant interference wave measuring device 100 may be configured to include other devices, other instruments, other members, and the like in addition to the antenna 2, the antenna mast 3, the turn table 4, the receiver 5, the controller 6, and the computer 7. In the radiant interference wave measuring device 100, the computer 7 may be configured to be integrated with any one or both of the receiver 5 and the controller 6.

The antenna 2 may be any antenna as long as it is an antenna that can detect an electric field intensity of electromagnetic waves. In the example illustrated in FIG. 1, the antenna 2 is a hybrid antenna that is supported by the antenna mast 3. The antenna 2 outputs an electric signal representing a voltage according to a detected electric field intensity to the receiver 5 to be described below. Here, in this embodiment, a case in which a position of the antenna 2 is represented using a position of a tip end of the antenna 2 will be described as an example. In addition, the position of the antenna 2 may be configured to be represented using another position according to the antenna 2 such as a reference point of antenna calibration or the like instead of the position of the tip end.

The antenna mast 3 may be any antenna mast as long as it is an antenna mast that can move the antenna 2 in a desired direction in accordance with control using the controller 6 to be described below. In the example illustrated in FIG. 1, the antenna mast 3 is an antenna mast that can move the antenna 2 in a vertical direction. In accordance with this, the radiant interference wave measuring device 100 can move a relative position of the antenna 2 with respect to the test piece 1 in a vertical direction.

Since the antenna 2 is supported by the antenna mast 3, in this embodiment, the position of the antenna 2 is changed in the vertical direction by the antenna mast 3 and is not changed in a direction different from the vertical direction. For this reason, in this embodiment, the position of the antenna 2 is represented using a position of the tip end of the antenna 2 in the vertical direction, in other words, a height of the tip end of the antenna 2 from the metallic floor surface in the anechoic chamber. Here, in the embodiment, the vertical direction represents two directions that are in parallel with the direction of gravity. In a case in which the metallic floor surface of the anechoic chamber is orthogonal to the direction of gravity, the vertical direction can be rephrased as two directions orthogonal to the metallic floor surface. More specifically, in the embodiment, an upward direction is a direction opposite to the direction of gravity out of two directions parallel to the direction of gravity. In addition, in the embodiment, a downward direction is a direction coinciding with the direction of gravity out of the two directions that are in parallel with the direction of gravity.

The turn table 4 is a table including a stand on which a test piece 1 is placed in a radiant interference wave test. The turn table 4 may be any object as long as it is an object that can rotate a test piece 1 placed on this stand around a predetermined rotation axis in accordance with control of the controller 6 to be described below. In accordance with this, the radiant interference wave measuring device 100 can relatively rotate the position of the antenna 2 around the rotation axis of the turn table 4 with respect to the test piece 1. Here, the position of the antenna 2 relatively rotating with respect to the test piece 1 means the position of the antenna relatively rotating in an azimuth angle direction around the rotation axis of the turn table 4. In addition, in this embodiment, as an example, as illustrated in FIG. 1, a case in which the rotation axis of the turn table 4 is an axis parallel to the vertical direction will be described. In addition, the rotation axis of the turn table 4 may be an axis that is not parallel to the vertical direction.

The receiver 5 is connected to the computer 7 to be able to communicate with each other in a wired or wireless manner. The receiver 5 acquires an electric signal output from the antenna 2 from the antenna 2. The receiver 5 outputs the acquired electric signal to the computer 7.

The controller 6 is a control device that controls translation of the antenna 2 according to the antenna mast 3 and rotation of a test piece 1 according to the turn table 4. For example, the controller 6 is connected to the antenna mast 3 and the turn table 4 to be able to communicate with each other in a wired manner. In addition, the controller 6 may control at least one of the antenna mast 3 and the turn table 4 in response to a request from the computer 7 or may control at least one of the antenna mast 3 and the turn table 4 based on an operation received from a user. Hereinafter, a case in which the controller 6 controls both the antenna mast 3 and the turn table 4 in response to a request from the computer 7 will be described.

The computer 7, for example, is a notebook PC. In addition, the computer 7 may be another information processing device such as a desk top PC or a tablet PC instead of the notebook PC.

The computer 7 performs a radiant interference wave test by controlling the controller 6 and the receiver 5. More specifically, the computer 7 sets two or more measurement points on a measurement surface determined in advance. The measurement surface is a virtual surface that surrounds a test piece 1. Two or more measurement points are virtual points respectively set at two or more measurement positions at which measurement target field intensities on the measurement surface are measured. In other words, two or more measurement points are virtual points representing measurement positions on the measurement surface. In other words, positions of measurement points set on the measurement surface are measurement positions represented by these measurement points. After two or more measurement points are set on the measurement surface, the computer 7 sequentially matches positions of two or more measurement points set on the measurement surface set in advance and the position of the antenna 2 by controlling the controller 6. Every time when the position of the antenna 2 is matched to the measurement position represented by each of two or more measurement points set on the measurement surface, the computer 7 acquires an electric signal output from the receiver 5 by controlling the receiver 5. This electric signal is an electric signal corresponding to an electric field intensity detected by the antenna 2 at the measurement position at which the antenna 2 is positioned. When an electric signal is acquired from the receiver 5, the computer 7 calculates an electric field intensity corresponding to the acquired electric signal as a measurement target field intensity. For example, the computer 7 calculates an electric field intensity corresponding to an acquired electric signal as a measurement target field intensity based on information associating a magnitude of an electric signal and a magnitude of an electric field intensity with each other. In a radiant interference wave test, the computer 7 calculates measurement target field intensities at measurement positions represented by two or more measurement points set on the measurement surface in such a process. In this embodiment, measurement of a measurement target field intensity represents the computer 7 calculating a measurement target field intensity based on an electric signal acquired from the receiver 5 in this way. In other words, in a radiant interference wave test, the computer 7 measures measurement target field intensities at measurement positions represented by two or more measurement points set on the measurement surface in such a process.

In a radiant interference wave test, after measurement target field intensities at measurement positions represented by two or more measurement points set on the measurement surface are measured, the computer 7 estimates a distribution of the measurement target field intensity on the measurement surface based on the measurement target field intensity at each measurement position as a measurement target field intensity distribution. A method for estimating a measurement target field intensity distribution may be a known method such as a method of applying a low pass filter or may be a method to be developed from now. The measurement target field intensity distribution is a distribution in which a position at which the measurement target field intensity is a maximum is represented as a first estimated maximum field intensity position. For this reason, estimated accuracy of the measurement target field intensity distribution estimated by the computer 7 is represented using a degree of matching between the first estimated maximum field intensity position represented by the estimated measurement target field intensity distribution and an actual maximum intensity position represented by an actual measurement target field intensity distribution. For this reason, a height of the estimated accuracy of the measurement target field intensity distribution represents a height of identification accuracy of the first estimated maximum field intensity position.

In a radiant interference wave test, after the measurement target field intensity distribution is estimated, the computer 7 identifies a first estimated maximum field intensity position based on the estimated measurement target field intensity distribution.

In a radiant interference wave test, after the first estimated maximum field intensity position is identified, the computer 7 matches the identified first maximum field intensity position and the position of the antenna 2 and measures a measurement target field intensity for a predetermined time. Then, the computer 7 determines whether or not a peak-to-peak value, an integrated value, an average value, and the like of the measurement target field intensity measured for a predetermined time are allowed values set in international standards or less. In this way, the radiant interference wave measuring device 100 performs the radiant interference wave test. In addition, the computer 7 may be configured to display information representing a determined result on a display unit (for example, a display) not illustrated in the drawing or may be configured to output information representing this result to another device.

In addition, before such a radiant interference wave test is performed, the computer 7, as will be described below, identifies arrangement of two or more measurement points used in the radiant interference wave test, in other words, arrangement of two or more measurement positions on the measurement surface.

Before a radiant interference wave test is performed, the computer 7 receives allowed value information representing an allowed value in accordance with an operation received from a user. Here, this allowed value represents an allowable magnitude as a deviation from a second estimated maximum field intensity position. The allowed value, for example, may be a value represented in units of a distance or may be a value represented using decibels. Hereinafter, as an example, a case in which the allowed value is a value represented using decibels will be described. In addition, the second estimated maximum field intensity position is a position estimated using a predetermined estimation method as the actual maximum field intensity position described above. The predetermined estimation method, for example, is theoretical calculation based on electromagnetics, a numerical value simulation, a measurement test performed in advance, or the like but is not limited thereto. The second estimated maximum field intensity position may be perceived as one type of a theoretical value for a position at which the measurement target field intensity becomes a maximum.

In addition, before a radiant interference wave test is performed, the computer 7 receives measurement condition information in accordance with an operation received from a user. Here, the measurement condition information is information representing measurement conditions for measurement of a radiant interference wave in a radiant interference wave test. The measurement condition information, for example, is information including information that includes test piece information about the test piece 1, measurement space information about a measurement space in which a radiant interference wave is measured, and radiant interference wave information about a radiant interference wave as information representing the measurement condition. In addition, in the measurement condition information, other information may be configured to be included in addition to such information.

The test piece information, for example, is information including information representing a height of an area of a cylindrical shape having a distance from the rotation axis of the turn table 4 to a part farthest in the diameter direction of the turn table 4 among parts included in the test piece 1 disposed on the turn table 4 as its radius and having the rotation axis of the turn table 4 as its center axis and a radius and like of the area of this cylindrical shape as sizes of the test piece 1. Here, in this embodiment, the diameter direction of the turn table 4 is a direction parallel to a horizontal direction. The horizontal direction is a direction that is orthogonal to the direction of gravity. Hereinafter, for the convenience of description, this area will be referred to as an electromagnetic wave source area in description. The test piece information may be configured to include other information about the test piece 1. In addition, the diameter direction of the turn table 4 may be a direction parallel to a direction different from the horizontal direction. Furthermore, the shape of the electromagnetic wave source area may be a different shape such as a rectangular parallelopiped shape instead of the cylindrical shape.

The measurement space information, for example, is information that includes measurement range information representing a range in which the tip end of the antenna 2 is moved in the vertical direction as a measurement range as information about this measurement space. In addition, the measurement space information may be configured to include other information about the measurement space.

The radiant interference wave information, for example, is information that includes information including wavelength information representing a wavelength of a radiant interference wave, information representing a frequency of the radiant interference wave, and the like. In addition, the radiant interference wave information may be configured to include other information about the radiant interference wave.

In addition, before a radiant interference wave test is performed, the computer 7, as described above, sets a measurement surface in accordance with an operation received from a user. In this embodiment, as an example, a case in which the measurement surface is a virtual surface of a cylindrical shape having a center axis of the electromagnetic wave source area as its center axis and including the entire electromagnetic wave source area will be described. For this reason, the measurement surface is a surface representing a set of points at which the tip end of the antenna 2 can be positioned in accordance with rotation of the turn table 4, vertical movement of the tip end of the antenna 2, and the like (in other words, a position at which the tip end of the antenna 2 can be positioned). In addition, in a case in which the radiant interference wave measuring device 100 includes a mechanism that is able to move the position of the tip end of the antenna 2 in the horizontal direction, the measurement surface may be a virtual surface having another shape on which the tip end of the antenna 2 can be positioned.

After the allowed value information and the measurement condition information are received, and the measurement surface is set, the computer 7 identifies arrangement of two or more measurement points set on the set measurement surface, that is, arrangement of two or more measurement positions based on an allowed value represented by the received allowed value information and the received measurement condition information. Here, this arrangement is determined in accordance with a measurement interval of the radiant interference wave. For this reason, more specifically, the computer 7 calculates a measurement interval of the radiant interference waves based on the allowed value and the measurement condition information and identifies the arrangement based on the calculated measurement interval of the radiant interference waves. Here, the measurement interval of radiant interference waves is an interval between measurement points adjacent to each other among two or more measurement points. In other words, the measurement interval of the radiant interference wave is an interval between measurement positions adjacent to each other among two or more measurement positions. By performing a measurement point arrangement identifying process, the computer 7 identifies such arrangement. The measurement point arrangement identifying process is a process of identifying arrangement of two or more measurement points based on the measurement condition information and the allowed value information received by the computer 7, the allowed value information, and the sampling theorem. In addition, the measurement point arrangement identifying process may be a process for identifying arrangement of two or more measurement points based on the measurement condition information received by the computer 7 and the sampling theorem. Furthermore, the measurement point arrangement identifying process may be any process as long as it is a process including a process capable of calculating a measurement interval of the radiant interference wave based on the sampling theorem. Hereinafter, as an example, a case in which the measurement point arrangement identifying process is a process including a first process, a second process, and a third process to be described below will be described.

The first process is a process of identifying arrangement of two or more measurement points based on a value of a measurement interval adjustment parameter for adjusting a measurement interval of a radiant interference wave and the measurement condition information received by the computer 7. The measurement interval adjustment parameter is a parameter of which a value becomes smaller every time when the third process to be described below is performed. Details of the measurement interval adjustment parameter will be described below.

Here, in the first process, a method of the computer 7 identifying arrangement of two or more measurement points may be any method.

For example, the computer 7 identifies arrangement of two or more measurement points in the first process using a method to be described below. This method is one of a plurality of methods known as methods allowing the computer 7 to identify arrangement of two or more measurement points.

First, the computer 7 sets a plurality of virtual points on a measurement surface set in advance and calculates positions of the plurality of virtual points set on the measurement surface based on the plurality of set virtual points, measurement condition information received in advance, and the value of the measurement interval adjustment parameter described above. In addition, hereinafter, for the convenience of description, each of the plurality of virtual points on the measurement surface will be simply referred to as a virtual point in description.

Here, there are a plurality of methods for calculating positions of a plurality of virtual points using the computer 7. In this embodiment, as an example, a case in which, in the method of calculating positions of a plurality of virtual points using the computer 7, a plurality of virtual lines, which are parallel to each other, growing in a predetermined direction along the measurement surface are set, and, for each of the plurality of set virtual lines, positions of a plurality of virtual points aligned on the virtual line are calculated by the computer 7 will be described. In addition, in this embodiment, as an example, a case in which the predetermined direction is parallel to a vertical direction will be described. Furthermore, in this embodiment, as an example, a case in which the plurality of virtual lines are aligned with an equal space on a measurement surface will be described. In other words, in this embodiment, as an example, a case in which the plurality of virtual lines are parallel to a center axis of a measurement surface having a cylindrical shape and are aligned with an equal space in the circumferential direction of the cylinder on the measurement surface having the cylindrical shape will be described. In addition, as the method of calculating positions of a plurality of virtual points using the computer 7, another method may be used. Furthermore, the predetermined direction may be parallel to another direction such as a horizontal direction, a circumferential direction of the measurement surface (that is, the azimuth angle direction described above), or the like instead of the vertical direction. In addition, some or all of the plurality of virtual lines may not be aligned with an equal space on the measurement surface.

Hereinafter, for simplification of description, in the process of calculating positions of a plurality of virtual points using the computer 7, a process of calculating positions of a plurality of virtual points aligned on one certain virtual line among a plurality of virtual lines will be described as an example. Thus, hereinafter, this one certain virtual line will be referred to as a target line in description. In addition, hereinafter, for the convenience of description, each of a plurality of virtual points aligned on a target line will be referred to as a target point in description. Unless the test piece 1 is not rotated, positions of a plurality of target points can be represented using heights in the vertical direction. Thus, hereinafter, for the convenience of description, a height of each of the plurality of target points in the vertical direction will be referred to as a position of each of a plurality of target points in description. A principle of calculating positions of a plurality of target points based on the value of the measurement interval adjustment parameter using the computer 7 will be described below.

After positions of the plurality of target points are calculated, the computer 7 identifies positions of two or more measurement points set on a target line, that is, measurement positions represented by two or more measurement points sets on the target line as arrangement of two or more measurement points set on the target line based on the calculated positions of the plurality of target points. In addition, every time each of a plurality of virtual lines, which are parallel to each other, growing in a predetermined direction along the measurement surface is selected as a target line, the computer 7 identifies a position of each of two or more measurement points set on a target line using such a method. In accordance with this, the computer 7 can identify arrangement of all the measurement points representing positions at which a radiant interference wave is measured. Hereinafter, for the convenience of description, each of two or more measurement points set on a target line will be referred to as a target measurement point in description.

The first process is a process of identifying arrangement of two or more measurement points using the method as described above.

The second process is a process of estimating a measurement target field intensity distribution on the measurement surface based on arrangement of two or more measurement points identified through the first process and calculating a position of the first estimated maximum field intensity position described above based on the estimated measurement target field intensity distribution in a case in which the arrangement of two or more measurement points is identified through the first process. The first estimated maximum field intensity position may be perceived as one type of test value for the maximum field intensity position. In other words, the allowed value described above can be rephrased as a value representing an allowable magnitude as a deviation between the first estimated maximum field intensity position and the second estimated maximum field intensity position described above.

The third process is a process of re-performing the first process by decreasing the value of the measurement interval adjustment parameter in a case in which a deviation between the first estimated maximum field intensity position and the second estimated maximum field intensity position calculated through the second process exceeds an allowed value represented by the allowed value information received by the computer 7.

Here, an interval between target points adjacent to each other among the plurality of target points described above is associated with the measurement interval adjustment parameter. In other words, an interval between target points adjacent to each other among the plurality of target points is changed in accordance with the value of the measurement interval adjustment parameter. In other words, the measurement interval adjustment parameter is included in a function representing an interval between target points adjacent to each other among the plurality of target points. For this reason, by decreasing the value of the measurement interval adjustment parameter in the third process, the computer 7 can decrease each interval between target points adjacent to each other among a plurality of target points. The smaller an interval between target points adjacent to each other among the plurality of target points, the smaller an interval between target measurement points adjacent to each other among two or more target measurement points that are identified through the first process by the computer 7. In other words, by decreasing the value of the measurement interval adjustment parameter in the third process, the computer 7 can decrease the interval between target measurement points adjacent to each other among two or more target measurement points to be identified. In a case in which a deviation between the first estimated maximum field intensity position and the second estimated maximum field intensity position calculated through the second process is an allowed value represented by the allowed value information received by the computer 7 or less in the third process, the computer 7 identifies the positions of two or more target measurement points identified through the first process as the arrangement of the two or more target measurement points. In accordance with this, the computer 7 can inhibit an interval between target measurement points adjacent to each other among two or more target measurement points from being excessively small as well. As a result, the computer 7 can estimate the measurement target field intensity distribution with high accuracy while inhibiting an increase of a time required for a radiant interference wave test.

As described above, by performing the first process to the third process in the measurement point arrangement identifying process, the computer 7 repeats the identifying of arrangement of two or more measurement points while decreasing the value of the measurement interval adjustment parameter until a deviation between the first estimated maximum field intensity position and the second estimated maximum field intensity position becomes an allowed value represented by the allowed value information received by the computer 7 or less. For this reason, a value given as an initial value of the measurement interval adjustment parameter is a maximum value that can be taken as the value of the measurement interval adjustment parameter. The maximum value that can be taken by the measurement interval adjustment parameter will be described below. In this way, the value of the measurement interval adjustment parameter is decreased by a predetermined value every time the third process is performed. Thus, as the number of times of the computer 7 performing the third process increases, a distance between measurement points in the arrangement of two or more measurement points identified through the first process and the second process becomes shorter.

However, according to the arrangement of two or more measurement points identified through such a measurement point arrangement identifying process, the closer a distance between a test piece 1 and a measurement point (that is, a distance between the test piece 1 and the antenna 2) and a wavelength of the radiant interference wave, the more the measurement accuracy of the measurement target field intensity distribution is degraded. In other words, in this arrangement, the lower the frequency of the radiant interference wave, the lower the measurement accuracy thereof. The reason for this is that the lower the frequency of the radiant interference wave, the more an interval between two measurement points adjacent to each other among two or more measurement points, that is, a measurement interval of the radiant interference wave is increased, based on the sampling theorem by the measurement point arrangement identifying process. A relation between a distance between a test piece 1 and a measurement point, a wavelength of a radiant interference wave, and this measurement accuracy has not been clearly disclosed until now. This leads to measurement of a measurement target field intensity distribution using an interval shorter than the interval calculated through the measurement point arrangement identifying process as a measurement interval of a radiant interference wave for inhibiting degradation of the measurement accuracy, which is not desirable. In such a case, a user of the radiant interference wave measuring device 100 unnecessarily increases a measurement time of the measurement target field intensity distribution.

Thus, the computer 7 calculates an upper limit value of the measurement interval of the radiant interference wave according to the antenna 2 based on positions of a plurality of electromagnetic wave sources according to a test piece 1 radiating a radiant interference wave and a relative positional relation between the antenna 2 measuring a radiant interference wave and the test piece 1. In accordance with this, the computer 7 can select the calculated upper limit value as a measurement interval of the radiant interference wave in measurement of a radiant interference wave of a low frequency band and can select a measurement interval of the radiant interference wave calculated through the measurement point arrangement identifying process as a measurement interval of the radiant interference wave that is actually used in a radiant interference wave measuring test in measurement of the radiant interference wave of a high frequency band. More specifically, the computer 7 can select the calculated upper limit value as the measurement interval of the radiant interference wave in a case in which a maximum value of the measurement interval of the radiant interference wave calculated through the measurement point arrangement identifying process exceeds the calculated upper limit value and can select a measurement interval of the radiant interference wave calculated through the measurement point arrangement identifying process as the measurement interval of the radiant interference wave in a case in which a maximum value of the measurement interval of the radiant interference wave calculated through the measurement point arrangement identifying process is the calculated upper limit value or less. As a result, the computer 7 can inhibit the measurement interval of the radiant interference wave from being unnecessarily increased based on the sampling theorem in a case in which the frequency of the radiant interference wave is low. In other words, the computer 7 can estimate a measurement target field intensity distribution with high accuracy while inhibiting an increase of a time required for a radiant interference wave test for a radiant interference wave having a frequency included in a wider frequency band.

After the measurement interval of the radiant interference wave is selected in this way, the computer 7 sets measurement points at positions of two or more measurement points identified based on the selected measurement interval of the radiant interference wave. In addition, the measurement surface is associated with a test piece 1 such that it rotates together with the test piece 1 rotated by the turn table 4. For this reason, a relative position of each measurement point set on the measurement surface with respect to the test piece 1 does not change even when the test piece 1 rotates.

Hereinafter, a process of the computer 7 identifying a position of each of two or more measurement points will be described in detail together with a functional configuration and a hardware configuration of such a computer 7.

Figure 2:
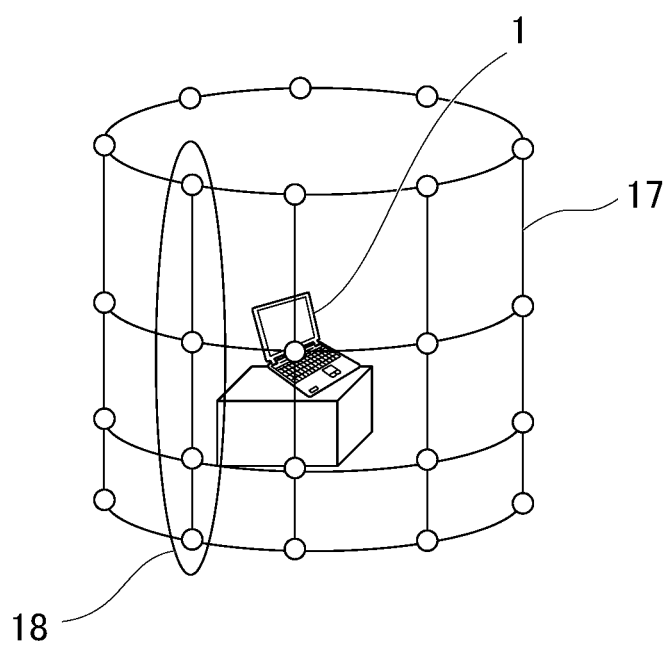
FIG. 2 is an image diagram illustrating an example of a view in which a plurality of measurement points are set on a measurement surface.

FIG. 2 is an image diagram illustrating an example of a view in which a plurality of measurement points are set on a measurement surface. A surface 17 illustrated in FIG. 2 represents an example of a virtual surface. In addition, each of a plurality of "o" illustrated in FIG. 2 illustrates an example of one of a plurality of measurement points set on the virtual surface without overlapping each other. A plurality of measurement points included in a range 18 illustrated in FIG. 2 represent an example of a plurality of target measurement points.

<Positional Relation Between Test Piece and Antenna Inside Anechoic Chamber in which Radiant Interference Wave Measuring Device is Installed>

Figure 3:
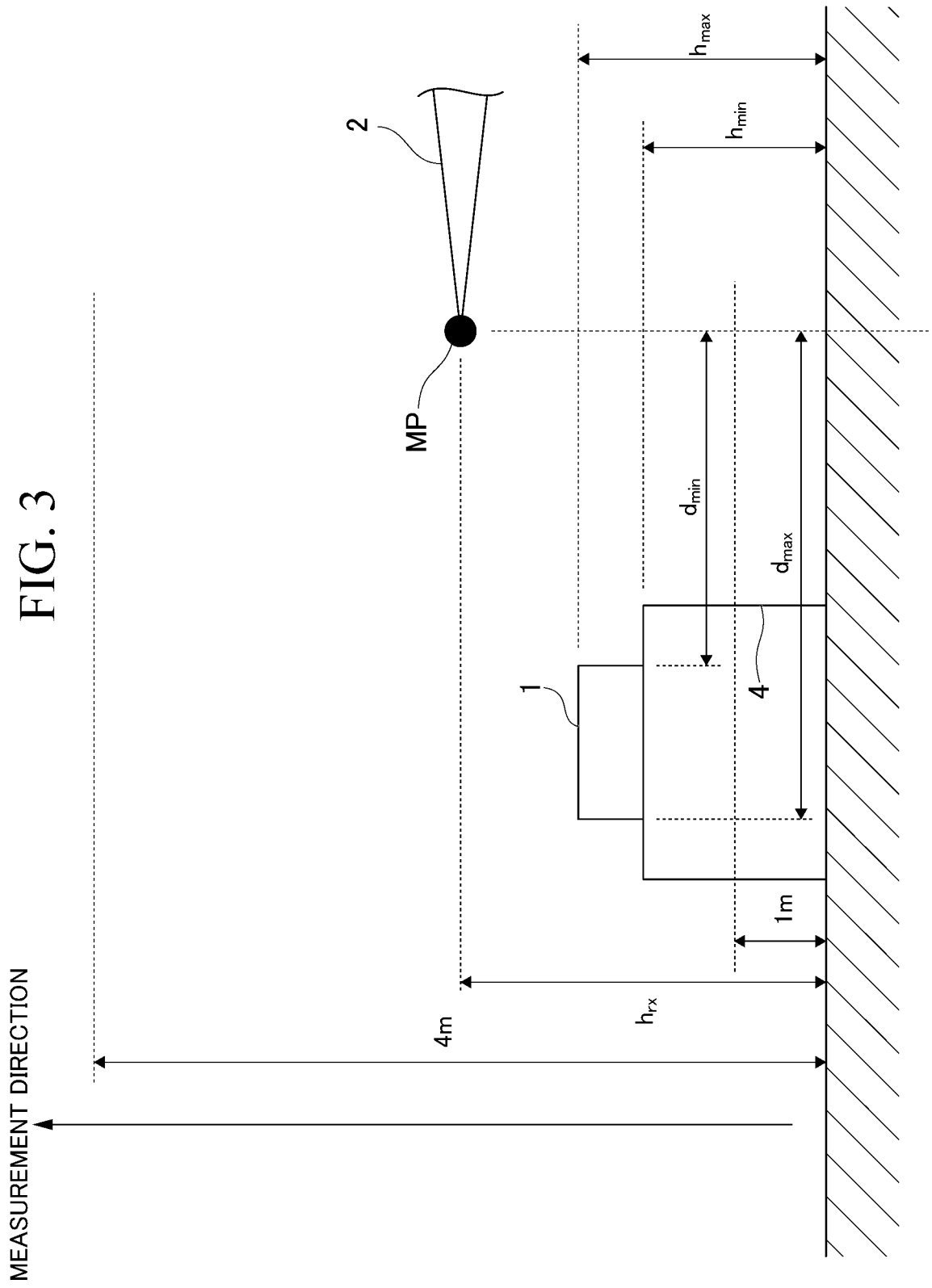
FIG. 3 is a diagram illustrating an example of a positional relation between a test piece 1 and an antenna 2 inside an anechoic chamber in which the radiant interference wave measuring device 100 is installed.

Hereinafter, by referring to FIG. 3, a positional relation between a test piece 1 and an antenna 2 inside an anechoic chamber in which the radiant interference wave measuring device 100 is installed will be described. FIG. 3 is a diagram illustrating an example of a positional relation between a test piece 1 and an antenna 2 inside an anechoic chamber in which the radiant interference wave measuring device 100 is installed. This positional relation is also a positional relation between each of a plurality of target points set on a certain target line and the test piece 1. In a subsequent description, for simplification of description, a case in which the shape of the test piece 1, as illustrated in FIG. 3, is a cylindrical shape will be described. In this embodiment, a height represents a length in a direction that is orthogonal to a metallic floor surface with reference to the metallic floor surface of the anechoic chamber, that is, the direction of gravity.

In the example illustrated in FIG. 3, a position of a certain target point MP and a position of the antenna 2 match each other. In this example, in a radiant interference wave test, a range in which the computer 7 moves the position of the antenna 2 in a vertical direction is a range of heights 1 m to 4 m. Hereinafter, for the convenience of description, in a radiant interference wave test, a height of a lower limit in the range in which the computer 7 moves the position of the antenna 2 in the vertical direction will be referred to as a measurement lower limit position in description. In addition, hereinafter, for the convenience of description, a height of an upper limit of this range will be referred to as a measurement upper limit position. In this example, the measurement lower limit position is 1 m. In addition, in this example, the measurement upper limit position is 4 m. The measurement range described above is a range from the measurement lower limit position to the measurement upper limit position. In other words, the measurement range is a range in which the antenna mast 3 moves the position of the antenna 2 along a target line in a radiant interference wave test.

Here, as described above, arrangement of two or more target measurement points is identified based on positions of a plurality of target points. More specifically, some or all of the plurality of target points are identified as two or more target measurement points. In other words, in a case in which all of the plurality of target points are identified as two or more target measurement points, the arrangement of the plurality of target points matches the arrangement of two or more target measurement points. From such situations, a target point MP illustrated in FIG. 3 is one of candidates for a target measurement point.

As illustrated in FIG. 3, hereinafter, for the convenience of description, among distances in a horizontal direction (a direction parallel to the metallic floor surface of the anechoic chamber), a shortest distance from the tip end of the antenna 2 to the test piece 1 will be denoted as $d_{min}$. Hereinafter, for the convenience of description, among distances in the horizontal direction, a longest distance from the tip end of the antenna 2 to the test piece 1 will be denoted as $d_{max}$. Hereinafter, for the convenience of description, a height of a lower face of the test piece 1 will be denoted as $h_{min}$. Hereinafter, for the convenience of description, a height of an upper face of the test piece 1 will be denoted as $h_{max}$. In addition, hereinafter, for the convenience of description, a height of the position of the antenna 2 will be denoted as $h_{rx}$.

<Functional Configuration of Computer 7>

Figure 4:
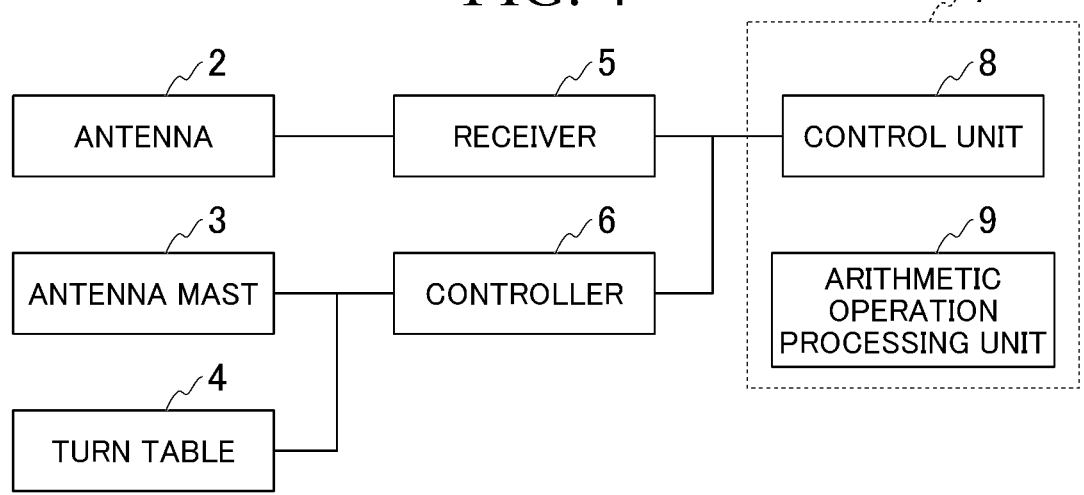
FIG. 4 is a diagram illustrating an example of the functional configuration of a computer 7.

Hereinafter, a functional configuration of the computer 7 will be described with reference to FIG. 4. FIG. 4 is a diagram illustrating an example of the functional configuration of the computer 7. In FIG. 4, an antenna 2, an antenna mast 3, a turn table 4, a receiver 5, and a controller 6 are illustrated together with the configuration of the computer 7.

The computer 7 includes a control unit 8 and an arithmetic operation processing unit 9. In addition, the computer 7 may be configured to include other functional components.

The control unit 8 controls the entire computer 7. In addition, for example, the control unit 8 controls the controller 6 that is connected to the computer 7 to be able to communicate with each other. Furthermore, for example, the control unit 8 controls the receiver 5 connected to the computer 7 to be able to communicate with each other.

The arithmetic operation processing unit 9 performs various calculations in radiant interference wave test performed by the radiant interference wave measuring device 100. For example, the arithmetic operation processing unit 9 calculates a measurement target field intensity based on an electric signal acquired from the receiver 5. In addition, for example, the arithmetic operation processing unit 9 calculates positions of a plurality of target points.

<Hardware Configuration of Computer 7>

Figure 5:
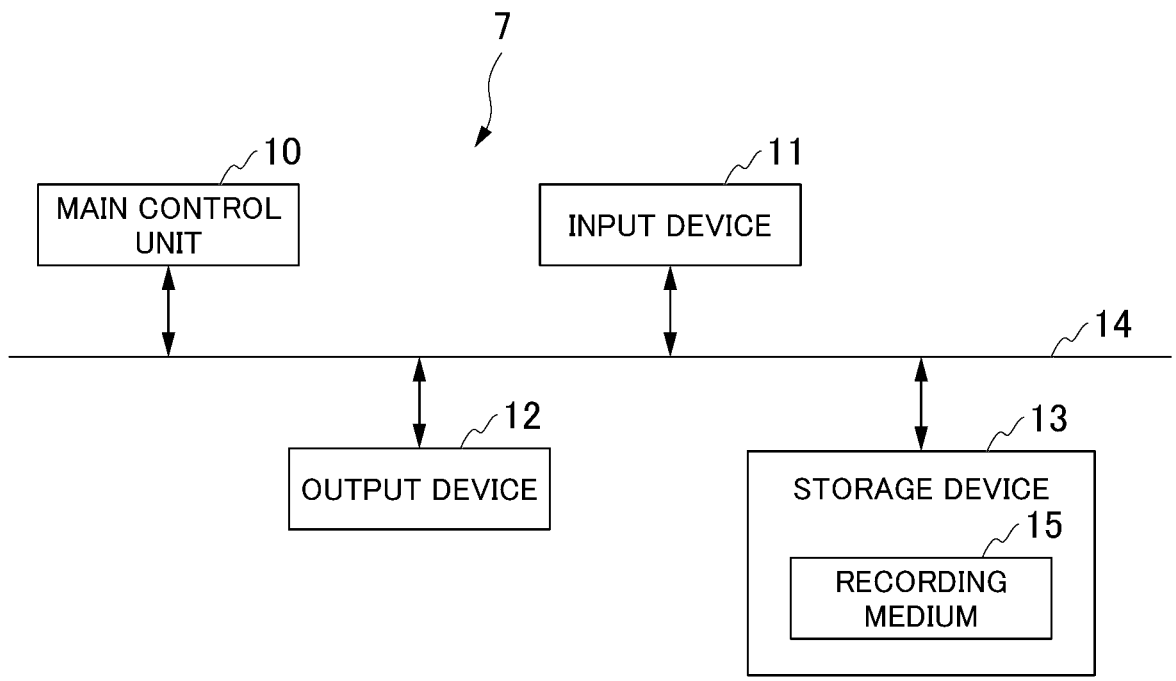
FIG. 5 is a diagram illustrating an example of the hardware configuration of the computer 7.

Hereinafter, a hardware configuration of the computer 7 will be described with reference to FIG. 5. FIG. 5 is a diagram illustrating an example of the hardware configuration of the computer 7.

The computer 7 includes a main control unit 10, an input device 11, an output device 12, a storage device 13, and a bus 14 connecting these to each other. In addition, the computer 7 may be configured to include other hardware in addition thereto.

The main control unit 10 includes a CPU (Central Processing Unit) and a RAM (Random Access Memory). By executing various programs stored in the storage device 13, the main control unit 10 realizes various functional components included in the computer 7 such as the control unit 8, the arithmetic operation processing unit 9, and the like described above.

The input device 11 is a device that accepts an operation from a user and, for example, is a keyboard, a mouse, a touch pad, or the like. In addition, the input device 11 may configure a touch panel integrally with the output device 12.

The output device 12 is a device that performs display and the like of various kinds of information output by the computer 7. For example, the output device 12 includes a display unit (for example, a display), which is not illustrated, of the computer 7.

The storage device 13 is a device that stores various kinds of information, various kinds of images, various programs executed by the main control unit 10, and the like. The storage device 13, for example, may be a hard disk device, an optical disc device, or the like or may be a flash memory device or the like. The storage device 13 includes a recording medium 15 in which various kinds of information is written. The storage device 13 writes (records) various kinds of information into the recording medium 15 in response to a request from the main control unit 10. In addition, in response to a request from the main control unit 10, the storage device 13 reads various kinds of information from the recording medium 15 and outputs the read information to the main control unit 10. For example, in the recording medium 15, programs realizing the control unit 8 and the arithmetic operation processing unit 9 are recorded.

<Principle of Calculation of Positions of Plurality of Target Points>

Hereinafter, the principle of calculation of positions of a plurality of target points will be described. The principle of calculation of positions of a plurality of target points is a principle based on a sampling theorem.

First, a radiant interference wave radiated from the test piece 1 is radiated not only from a certain one point of a material composing the test piece 1. Thus, hereinafter, the test piece 1 is assumed to be a collection of P electromagnetic wave sources of a point shape radiating electromagnetic waves as radiant interference waves. In addition, hereinafter, it is assumed that electromagnetic waves of the same frequency and the same wavelength are radiated as radiant interference waves from P electromagnetic wave sources. P may be any integer as long as it is an integer equal to or greater than 2. A distance from a p-th electromagnetic wave source among P electromagnetic wave sources to a position of a certain virtual point (for example, a target point, a target measurement point, or the like) will be denoted as $r_p$. Here, p is one integer among 1 to P. In addition, hereinafter, for the convenience of description, this virtual point will be referred to as an observation point in description.

An electric field intensity generated by a radiant interference wave radiated from the p-th electromagnetic wave source at a position away from the electromagnetic wave source by a distance $r_p$ can be represented using a plane wave as in the following Equation (1).

$$E = (a_p + ib_p)\exp(ikr_p) \tag{1}$$

Here, each of $a_p$ and $b_p$ represented in Equation (1) is a coefficient representing an amplitude of a plane wave representing an electric field intensity generated by a radiant interference wave radiated from the p-th electromagnetic wave source at a position away from this electromagnetic wave source by a distance $r_p$ and is a real number. In addition, i represented in Equation (1) is an imaginary number unit. k represented in Equation (1) represents a wave number of a radiant interference wave radiated from each of P electromagnetic wave sources. In a case in which a radiant interference wave corresponding to one wavelength is counted as one wave, the wave number of this radiant interference wave is the number of waves included in a unit length. In addition, the wave number of this radiant interference wave is a value acquired by dividing $2\pi$ by the wavelength of this radiant interference wave. Since this electric field intensity can be represented as in Equation (1), an electric field intensity generated by radiant interference waves radiated from P electromagnetic wave sources at an observation point, as represented in the following Equation (2), is represented by superimposing the plane waves represented in Equation (1) above.

$$E = \sum_{p=1}^{P}(a_p + ib_p)\exp(ikr_p) \tag{2}$$

Thus, the square of the electric field intensity generated at an observation point by radiant interference waves radiated from P electromagnetic wave sources is calculated as in the following Equation (3).

$$\begin{aligned}|E|^2 &= \left|\sum_{p=1}^{P}(a_p + ib_p)\exp(ikr_p)\right|^2 \\ &= \left(\sum_{p=1}^{P}(a_p\cos(kr_p) - b_p\sin(kr_p))\right)^2 + \\ &\quad \left(\sum_{p=1}^{P}(a_p\sin(kr_p) + b_p\cos(kr_p))\right)^2 \\ &= \sum_{p=1}^{P}\sum_{q=1}^{P}(a_p\cos(kr_p) - b_p\sin(kr_p)) \cdot \\ &\quad (a_q\cos(kr_q) - b_q\sin(kr_q)) + \\ &\quad \sum_{p=1}^{P}\sum_{q=1}^{P}(a_p\sin(kr_p) + b_p\cos(kr_p)) \cdot \\ &\quad (a_q\sin(kr_q) + b_q\cos(kr_q)) \\ &= \sum_{p=1}^{P}\sum_{q=1}^{P}((a_pa_q + b_qb_p)\cos(k(r_p - r_q))) + \\ &\quad \sum_{p=1}^{P}\sum_{q=1}^{P}((a_pb_q - a_qb_p)\sin(k(r_p - r_q)))\end{aligned} \tag{3}$$

Here, $r_q$ represented in Equation (3) represents a distance from a q-th electromagnetic wave source among P electromagnetic wave sources to the position of an observation point. In addition, q is any one integer among 1 to P and may be an integer that is the same as p or may be an integer different from p. As can be understood from the right side of the lowest stage of Equation (3), the square of an electric field intensity generated at an observation point by radiant interference waves radiated from P electromagnetic wave sources is a sum of sinusoidal waves vibrating with respect to $(r_p - r_q)$. From this, it can be understood that a distribution of the electric field intensity of radiant interference waves radiated from P electromagnetic wave sources can be perfectly reproduced by satisfying conditions represented in the following Equation (4) based on the sampling theorem.

$$\Delta(r_p - r_q) \le \frac{\lambda}{2} \tag{4}$$

Here, $\lambda$ represented in Equation (4) is a wavelength of an electromagnetic wave radiated as a radiant interference wave radiated from each electromagnetic wave source. In addition, $\Delta(r_p - r_q)$ represented in Equation (4) represents a minute change amount of $(r_p - r_q)$. The condition acquired as Equation (4) in this way can be modified and represented as a condition to be satisfied for an interval between two target points adjacent to each other among a plurality of target points in accordance with a method to be described below.

When a height of the p-th electromagnetic wave source is denoted as $h_p$, and a distance from this electromagnetic wave source to an observation point in the horizontal direction is denoted as $d_p$, a distance $r_p$ can be represented as in the following Equation (5) using a position $h_{rx}$ of the observation point in accordance with the Pythagorean theorem.

$$r_p = \sqrt{d_p^2 + (h_{rx} - h_p)^2} \tag{5}$$

In addition, when a height of the q-th electromagnetic wave source is denoted as $h_q$, and a distance from this electromagnetic wave source to an observation point in the horizontal direction is denoted as $d_q$, a distance $r_q$ can be represented as in the following Equation (6) using the position $h_{rx}$ of the observation point in accordance with the Pythagorean theorem.

$$r_q = \sqrt{d_q^2 + (h_{rx} - h_q)^2} \tag{6}$$

In a case in which the range of frequencies of radiant interference waves radiated from P electromagnetic wave sources is 30 MHz to 1000 MHz, in a radiant interference wave test, measurement of radiant interference waves is regulated to be performed on a metallic floor surface of an anechoic chamber. For this reason, in this case, when the reflection principle is taken into consideration, each of the height $h_p$ and the height $h_q$ takes a positive value or a negative value. Hereinafter, as an example, it is assumed that the height $h_p$ is lower than the height $h_q$.

Here, $\Delta(r_p - r_q)$ represented in Equation (4) above can be calculated as in the following Equation (7) and Equation (8) based on Equation (5) and Equation (6).

$$\Delta(r_p - r_q) = \frac{\partial(r_p - r_q)}{\partial h_{rx}} = K_h \Delta h_{rx} \tag{7}$$

Here, in Equation (7), an expression acquired by calculating a partial differential coefficient represented in Equation (7) is defined as $K_h$. Hereinafter, for the convenience of description, $K_h$ will be referred to as a correction coefficient in description. A specific expression of the correction coefficient $K_h$ is represented in the following Equation (8).

$$K_h = \frac{h_{rx} - h_p}{\sqrt{d_p^2 + (h_{rx} - h_p)^2}} - \frac{h_{rx} - h_q}{\sqrt{d_q^2 + (h_{rx} - h_q)^2}} \tag{8}$$

Based on this Equation (8) and Equation (4) represented above, the condition acquired as Equation (4) can be modified and represented as in the following Equation (9) as a condition to be satisfied for an interval $\Delta h_{rx}$ between two target points adjacent to each other among a plurality of target points.

$$\Delta h_{rx} \leq \frac{\lambda}{2K_h} \tag{9}$$

Here, the correction coefficient $K_h$ represented in Equation (8) above needs to satisfy conditions represented in the following Equations (10) to Equation (13) from a geometrical request.

$$\frac{\partial K_h}{\partial h_p} \leq 0, \frac{\partial K_h}{\partial h_q} \geq 0 \tag{10}$$

$$\frac{\partial K_h}{\partial d_p} \geq 0, \frac{\partial K_h}{\partial d_q} \leq 0 \text{ for } (h_{rx} \leq h_p, h_{rx} \leq h_q) \tag{11}$$

$$\frac{\partial K_h}{\partial d_p} \leq 0, \frac{\partial K_h}{\partial d_q} \leq 0 \text{ for } (h_{rx} \geq h_p, h_{rx} \leq h_q) \tag{12}$$

$$\frac{\partial K_h}{\partial d_p} \leq 0, \frac{\partial K_h}{\partial d_q} \geq 0 \text{ for } (h_{rx} \geq h_p, h_{rx} \geq h_q) \tag{13}$$

In a case in which an electric wave absorber is installed on the ground plane based on the conditions of Equation (10) to Equation (13) represented above and the size of the test piece 1 (in this example, the size of the test piece 1 having a cylindrical shape illustrated in FIG. 3), as a condition under which the absolute value of the correction coefficient $K_h$ becomes a maximum $K_{hmax}$, the following Equation (14) can be acquired. In addition, in a case in which no electric wave absorber is installed on the ground plane based on the conditions of Equation (10) to Equation (13) represented above and the size of the test piece 1 (in this example, the size of the test piece 1 having a cylindrical shape illustrated in FIG. 3), an equation acquired by substituting $h_{min}$ represented in Equation (14) with $-h_{max}$ is formed.

$$K_{hmax}(h_{rx}) = \begin{cases} \dfrac{h_{rx} - h_{min}}{\sqrt{d_{max}^2 + (h_{rx} - h_{min})^2}} - \dfrac{h_{rx} - h_{max}}{\sqrt{d_{min}^2 + (h_{rx} - h_{max})^2}}, & \text{for } (h_{rx} \leq h_{min}) \\[2ex] \dfrac{h_{rx} - h_{min}}{\sqrt{d_{min}^2 + (h_{rx} - h_{min})^2}} - \dfrac{h_{rx} - h_{max}}{\sqrt{d_{min}^2 + (h_{rx} - h_{max})^2}}, & \text{for } (h_{min} \leq h_{rx} \leq h_{max}) \\[2ex] \dfrac{h_{rx} - h_{min}}{\sqrt{d_{min}^2 + (h_{rx} - h_{min})^2}} - \dfrac{h_{rx} - h_{max}}{\sqrt{d_{max}^2 + (h_{rx} - h_{max})^2}}, & \text{for } (h_{rx} \geq h_{max}) \end{cases} \tag{14}$$

In this way, a certain target point is set as a first target point, another target point adjacent to the first target point is set as a second target point, and a distance from the first target point to the second target point, that is, an interval between the first target point and the second target point, can be calculated as a maximum value of a value acquired by substituting $K_h$ represented in Equation (9) above with $K_{hmax}$ represented in Equation (14). As a result, by adding this calculated interval to the position of the first target point, the computer 7 can calculate the position of the second target point.

Here, the computer 7 calculates an interval between the first target point and the second target point using the following Equation (15) as an equation acquired by further extending Equation (9) represented above.

$$\Delta h_{rx} = \frac{\lambda S}{K_h} \tag{15}$$

S represented in Equation (15) is the measurement interval adjustment parameter described above. As represented in Equation (15), S is a parameter by which the wavelength λ of the radiant interference wave is multiplied. For this reason, the measurement interval adjustment parameter S can be rephrased as a parameter that virtually adjusts the wavelength λ of the radiant interference wave. Here, in a case in which the measurement interval adjustment parameter S takes a maximum value, a right side of Equation (15) needs to match the right side of Equation (9) represented above. The reason for this is that Equation (9) represented above is a condition for satisfying the sampling theorem. For this reason, an initial value of the measurement interval adjustment parameter S represented in Equation (15) is 0.50. In addition, apparently, in a case in which λ is substituted with (λ/2) in Equation (15), the initial value of the measurement interval adjustment parameter S becomes 1.00. The computer 7 decreases the value of the initial value of the measurement interval adjustment parameter S every time the third process is performed. In accordance with this, the computer 7 can decrease $\Delta h_{rx}$ calculated using Equation (15) every time the third process is performed. In other words, by decreasing the measurement interval adjustment parameter S, the computer 7 can shorten the interval between the first target point and the second target point. In other words, the measurement interval adjustment parameter S is an arbitrary parameter that is manually applied to decrease the interval between the first target point and the second target point in a range satisfying the condition of Equation (9) represented above.

Here, the position of the observation point $h_{rx}$ (that is, the position of the antenna 2) can be perceived as a position of each of a plurality of target points. Thus, the position of the n-th target point among the plurality of target points will be denoted as $h_{rx,n}$. In accordance with this, by using $h_{rx,n}$ and Equation (14) and Equation (15) represented above, positions of the plurality of target points can be calculated using a sequential equation represented in the following Equation (16). Here, n is an integer equal to or greater than 1.

$$h_{rx,0} = h_{rx\_min}$$

$$h_{rx,1} = h_{rx\_min} + \Delta h_{rx}(h_{rx,0})$$

$$h_{rx,n} = h_{rx,n-1} + \Delta h_{rx}(h_{rx,n-1}), \text{ for } (n \geq 2) \quad (16)$$

$h_{rx\_min}$ illustrated in Equation (16) represents a position of a target point positioned the lowest in the vertical direction among a plurality of target points. $h_{rx\_min}$ may be manually given or may coincide with a measurement lower limit position, or may be determined using any other method.

Here, a radiant interference wave measuring device (for example, a conventional radiant interference wave measuring device) different from the radiant interference wave measuring device 100 calculates positions of a plurality of target points using Equation (9), Equation (14), and Equation (16) and identifies positions of two or more target measurement points based on the calculated positions of the plurality of target points. Then, this radiant interference wave measuring device estimates a measurement target field intensity distribution based on the two or more target measurement points that have been identified. However, this radiant interference wave measuring device cannot perfectly reproduce a measurement target field intensity distribution in accordance with a filtering process performed when positions of the plurality of target points are calculated and an extrapolation process for ends of the plurality of measurement points.

The radiant interference wave measuring device 100 can solve such a problem using Equation (14) to Equation (16) represented above. In other words, by using Equation (14) to Equation (16) represented above, the radiant interference wave measuring device 100 can reproduce a measurement target field intensity distribution with estimation accuracy represented by an allowed value received in advance, that is, accuracy desired by a user. In other words, the radiant interference wave measuring device 100 can reproduce a measurement target field intensity distribution with accuracy desired by a user without reproducing the measurement target field intensity distribution with accuracy higher than that desired by the user, that is, excessive accuracy. As a result, the radiant interference wave measuring device 100 can estimate a measurement target field intensity distribution with high accuracy while inhibiting an increase of a time required for a radiant interference wave test. Hereinafter, the measurement point arrangement identifying process performed by the radiant interference wave measuring device 100 will be described. More specifically, the measurement point arrangement identifying process is a process in which, for each of a plurality of lines selected as a target line, the radiant interference wave measuring device 100 calculates positions of a plurality of target points using Equation (14) to Equation (16) represented above and identifies measurement positions represented by two or more target measurement points as arrangement of two or more target measurement points based on the calculated positions. In other words, the measurement point arrangement identifying process is a process in which the radiant interference wave measuring device 100 identifies arrangement of two or more measurement points.

<Measurement Point Arrangement Identifying Process Performed by Radiant Interference Wave Measuring Device>

Figure 6:
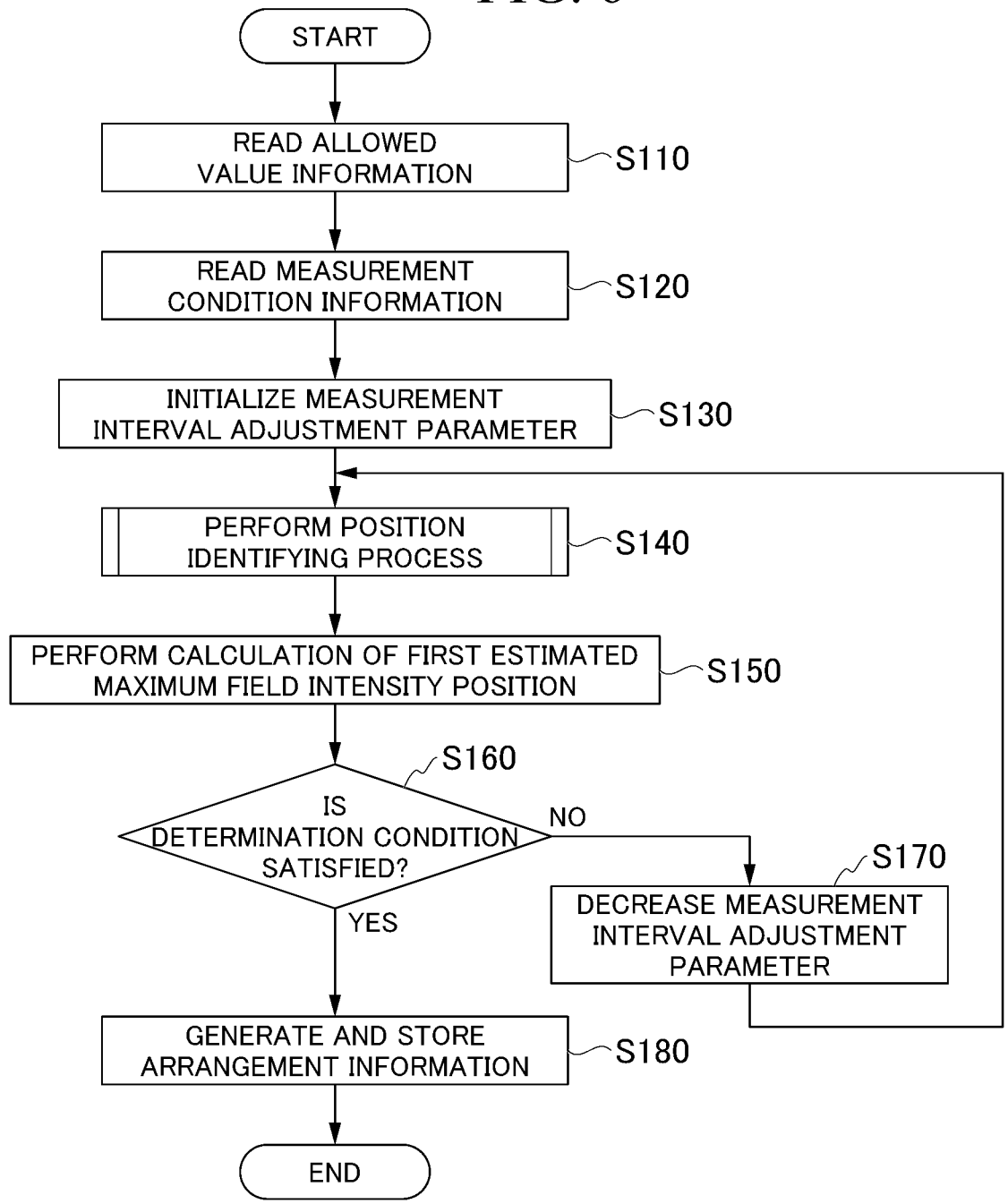
FIG. 6 is a diagram illustrating an example of the flow of a measurement point arrangement identifying process performed by the radiant interference wave measuring device 100.

Hereinafter, the measurement point arrangement identifying process performed by the radiant interference wave measuring device 100 will be described with reference to FIG. 6. FIG. 6 is a diagram illustrating an example of the flow of a measurement point arrangement identifying process performed by the radiant interference wave measuring device 100. Hereinafter, as an example, a case in which an operation for causing the computer 7 to start the measurement point arrangement identifying process is received by the computer 7 at a timing before the process of Step S110 illustrated in FIG. 6 is performed will be described. In other words, hereinafter, as an example, a case in which a measurement surface is set by the computer 7 at this timing will be described. In addition, hereinafter, as an example, a case in which, at this timing, allowed value information representing an allowed value desired by a user is received by the computer 7, and the allowed value information received by the computer 7 is stored in the recording medium 15 of the storage device 13 will be described. Furthermore, as an example, a case in which, at this timing, measurement condition information is received by the computer 7, and the measurement condition information received by the computer 7 is stored in the recording medium 15 of the storage device 13 will be described. In the measurement condition information, at least radiant interference wave information including test piece information including information representing $d_{min}$, $d_{max}$, $h_{min}$, and $h_{max}$ described above, measurement space information representing a measurement upper limit position, a measurement lower limit position, and $h_{rx\_min}$, and wavelength information representing λ described above is included. Here, $h_{rx\_min}$ is a position of a target point positioned the lowest among a plurality of target points and is a position desired by a user. In addition, hereinafter, as an example, a case in which, at this timing, the second estimated maximum field intensity position described above is received by the computer 7, and second estimated maximum field intensity position information representing the second estimated maximum field intensity position received by the computer 7 is stored in the recording medium 15 of the storage device 13 will be described.

After an operation causing the computer 7 to start the measurement point arrangement identifying process is received by the computer 7, the arithmetic operation processing unit 9 reads the allowed value information stored in the recording medium 15 of the storage device 13 in advance from the storage device 13 (Step S110).

Next, the arithmetic operation processing unit 9 reads the measurement condition information stored in the recording medium 15 of the storage device 13 in advance from the storage device 13 (Step S120).

Next, the arithmetic operation processing unit 9 performs initialization of the measurement interval adjustment parameter S (Step S130). More specifically, the arithmetic operation processing unit 9 generates a variable storing the value of the measurement interval adjustment parameter S and initializes the value of the generated variable to an initial value in Step S130. As described above, the initial value of the measurement interval adjustment parameter S is 0.50. In other words, in Step S130, the arithmetic operation processing unit 9 stores 0.50 in this variable. Hereinafter, for the convenience of description, this variable will be referred to as a storage variable in description. In addition, in the process of the flowchart illustrated in FIG. 6, the process of Step S110, the process of Step S120, and the process of Step S130 may be performed in a different order or may be performed in parallel with each other.

Next, the arithmetic operation processing unit 9 performs a position identifying process based on the measurement condition information read in Step S120 and the value stored in the storage variable (Step S140). The position identifying process is a process in which, by using the measurement condition information read in Step S120, the value stored in the storage variable, and Equation (14) to Equation (16) described above, positions of a plurality of target points are calculated for each of a plurality of virtual lines set on the measurement surface, and positions of two or more target measurement points for each line are identified based on the positions calculated for each line. Details of the position identifying process will be described below. In other words, the position identifying process is a process of identifying arrangement of two or more measurement points set on the measurement surface.

Next, the arithmetic operation processing unit 9 estimates a measurement target field intensity distribution based on arrangement of two or more measurement points identified in Step S140. Then, the arithmetic operation processing unit 9 calculates the first estimated maximum field intensity position described above based on the estimated measurement target field intensity distribution (Step S150). Here, a method for estimating a measurement target field intensity distribution based on the arrangement identified in Step S140 may be a known method or may be a method to be developed from now on. In addition, a method for calculating a first estimated maximum field intensity position based on the estimated measurement target field intensity distribution may be a known method or a method to be developed from now on.

Next, the arithmetic operation processing unit 9 determines whether or not a predetermined determination condition is satisfied based on the first estimated maximum field intensity position calculated in Step S150 (Step S160). Here, the predetermined determination condition is a deviation between the second estimated maximum field intensity position represented by the second estimated maximum field intensity position information stored in the recording medium 15 in advance and the first estimated maximum field intensity position (that is, a deviation between the first estimated maximum field intensity position and the second estimated maximum field intensity position is a difference between the first estimated maximum field intensity position and the second estimated maximum field intensity position) being the allowed value represented by the allowed value information read in Step S110 or less. In other words, the arithmetic operation processing unit 9, in Step S160, calculates this deviation as a value represented using decibels and determines that a predetermined determination condition is satisfied in a case in which the calculated value is the allowed value or less. On the other hand, in a case in which the calculated value exceeds the allowed value, the arithmetic operation processing unit 9 determines that the predetermined determination condition is not satisfied.

In a case in which it is determined that the predetermined condition is not satisfied (Step S160—No), the arithmetic operation processing unit 9 stores a value acquired by subtracting a predetermined value from the value of the measurement interval adjustment parameter stored in the storage variable as a new value of the measurement interval adjustment parameter. In other words, in this case, the arithmetic operation processing unit 9 decreases the measurement interval adjustment parameter (Step S170). Then, after the process of Step S170 is performed, the arithmetic operation processing unit 9 causes to process to proceed to Step S140 and performs the position identifying process again based on the measurement condition information read in Step S120 and the value stored in the storage variable. Here, for example, the predetermined value is 0.05. In addition, the predetermined value may be a value smaller than 0.05 or may be a value larger than 0.05.

On the other hand, in a case in which it is determined that the predetermined determination condition is satisfied (Step S160—Yes), the arithmetic operation processing unit 9 generates arrangement information representing arrangement of two or more measurement points identified in the process of Step S140 performed last and stores the generated arrangement information in the recording medium 15 of the storage device 13 (Step S180). After the process of Step S180 is performed, the arithmetic operation processing unit 9 ends the process of the flowchart illustrated in FIG. 6.

In accordance with the measurement point arrangement identifying process as described above, the computer 7 identifies arrangement of two or more measurement points representing positions at which a radiant interference wave is measured based on the allowed value represented by the received allowed value information and the received measurement condition information. More specifically, by performing the first process (that is, the process of Step S140) of identifying arrangement of two or more measurement points representing positions at which a radiant interference wave is measured based on the value of the measurement interval adjustment parameter S adjusting a distance between measurement points in the arrangement of two or more measurement points and the received measurement condition information, the second process (that is, the process of Step S150) of calculating the first estimated maximum field intensity position at which the intensity of the radiant interference wave is estimated to be a maximum based on the arrangement of two or more measurement points identified in the first process in a case in which the arrangement of two or more measurement points is identified through the first process, and the third process (that is, the process performed in order of Step S160, Step S170, and Step S140) of performing the first process by decreasing the value of the measurement interval adjustment parameter S in a case in which a deviation between the first estimated maximum field intensity position calculated through the second process and the second estimated maximum field intensity position exceeds the allowed value, the computer 7 identifies the arrangement of two or more measurement points.

<Position Identifying Process Performed by Radiant Interference Wave Measuring Device>

Figure 7:
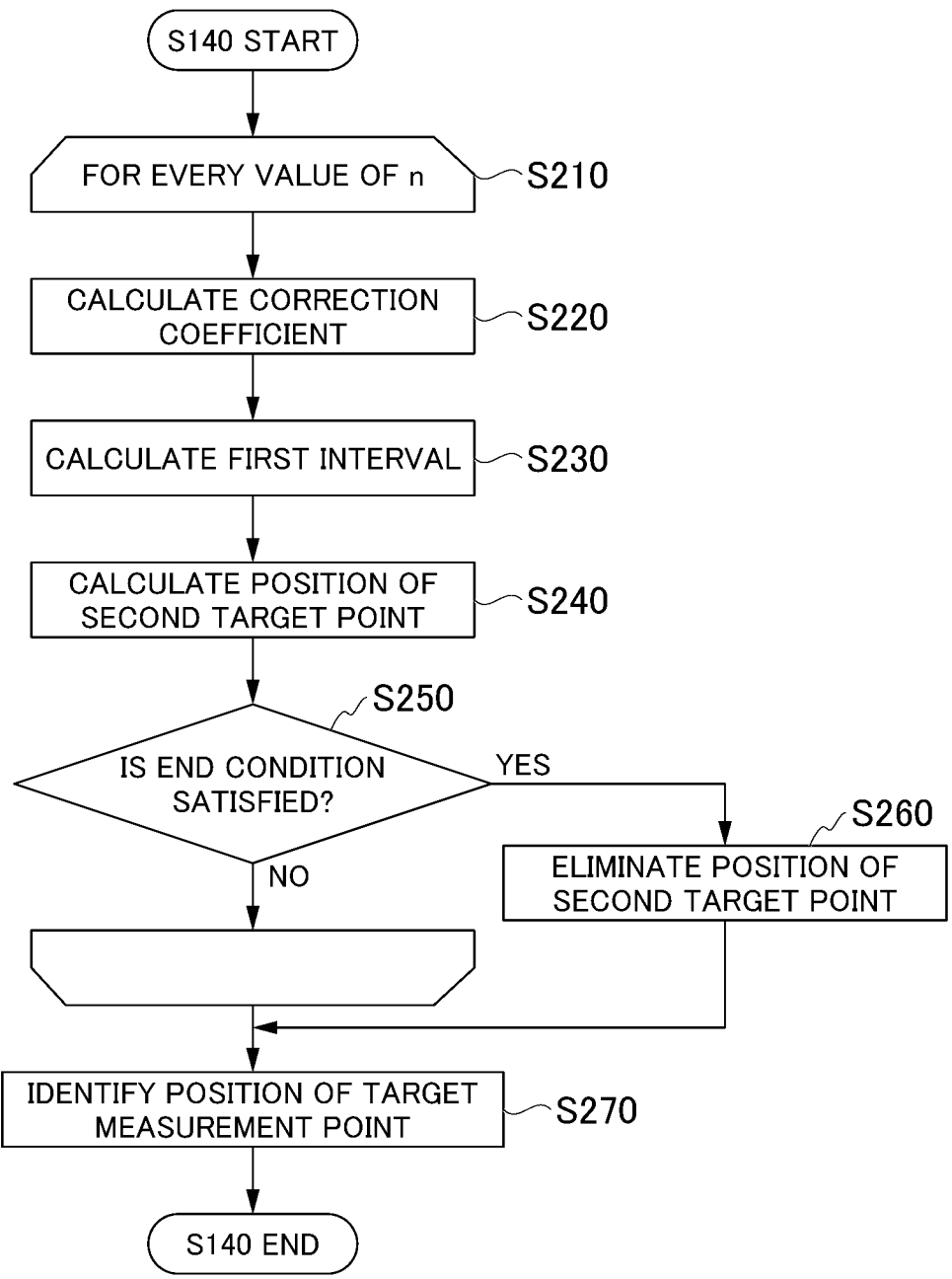
FIG. 7 is a diagram illustrating an example of the flow of a position identifying process of Step S140 illustrated in FIG. 6.

Hereinafter, the position identifying process of Step S140 illustrated in FIG. 6 will be described with reference to FIG. 7. FIG. 7 is a diagram illustrating an example of the flow of the position identifying process of Step S140 illustrated in FIG. 6. By performing the processes of Step S210 to Step S270 for each of a plurality of virtual lines set on the measurement surface, the computer 7 identifies the arrangement of two or more measurement points.

The arithmetic operation processing unit 9 generates n as a variable representing a sequence of each of a plurality of target points. Then, the arithmetic operation processing unit 9 initializes the value of the generated n to an initial value. Hereinafter, as an example, a case in which the initial value is 1 will be described. In addition, instead of 1, the initial value may be an integer equal to or greater than 2 or may be an integer equal to or less than 0. After the value of n is initialized, the arithmetic operation processing unit 9 selects an integer equal to or greater than 1 (in other words, an integer equal to or greater than the initial value) in order from 1 (in other words, in order from the initial value) as the value of n and repeatedly performs the processes of Step S220 to Step S260 for each value of the selected n (Step S210).

After the value of n is selected in Step S210, the arithmetic operation processing unit 9 generates a target point corresponding to the value of n that is currently selected as one of a plurality of target points. Here, hereinafter, for the convenience of description, a target point corresponding to the value of n will be referred to as a first target point in description. In addition, hereinafter, for the convenience of description, a target point corresponding to the value of (n+1) will be referred to as a second target point in description. However, in this stage, the arithmetic operation processing unit 9 does not generate the second target point yet. After the first target point is generated, the arithmetic operation processing unit 9 calculates $K_{hmax}$ as a correction coefficient corresponding to the first target point based on $d_{min}$, $d_{max}$, $h_{min}$, and $h_{max}$ represented by information included in the measurement condition information read in Step S120 illustrated in FIG. 6, the position of the first target point, Equation (14) represented above, and the sampling theorem (Step S220). Here, hereinafter, for the convenience of description, the position of the first target point in the case of n=1 will be denoted as $h_{rx,0}$. In addition, hereinafter, for the convenience of description, the position of the first target point in the case of n≥2 will be denoted as $h_{rx,n-1}$. In a case in which the process of Step S220 of the first time is performed, the arithmetic operation processing unit 9 initializes $h_{rx,0}$ to the position $h_{rx\_min}$ of the target point positioned the lowest in the vertical direction among a plurality of target points based on the measurement condition information read in Step S120 illustrated in FIG. 6. In addition, in a case in which the process of Step S220 of the m-th time is performed, the arithmetic operation processing unit 9 identifies the position of the second target point calculated in the process of Step S240 of the (m−1)-th time as a position of the first target point in the process of Step S220 of the m-th time. Here, m is an integer equal to or greater than 2.

For example, in the case of n=1, the arithmetic operation processing unit 9 calculates $K_{hmax}(h_{rx\_min})$ as a correction coefficient corresponding to the first target point in the process of Step S220. In this case, the arithmetic operation processing unit 9, in the process of Step S220, calculates $K_{hmax}(h_{rx\_min})$ as a correction coefficient corresponding to the first target point based on $h_{min}$, $h_{max}$, $d_{min}$, and $d_{max}$ represented by information included in the measurement condition information and Equation (14) after substitution of $h_{rx\_min}$ into $h_{rx}$. In addition, for example, in the case of n≥2, the arithmetic operation processing unit 9, in the process of Step S220, calculates $K_{hmax}(h_{rx,n-1})$ as a correction coefficient corresponding to the first target point. In this case, the arithmetic operation processing unit 9, in the process of Step S220, calculates $K_{hmax}(h_{rx,n})$ as a correction coefficient corresponding to the first target point based on $h_{min}$, $h_{max}$, $d_{min}$, and $d_{max}$ represented by information included in the measurement condition information and Equation (14) after substitution of $h_{rx,n-1}$ into $h_{rx}$.

After the process of Step S220 is performed, the arithmetic operation processing unit 9 calculates an interval between the first target point and the second target point as a first interval corresponding to the first target point based on the measurement condition information read in Step S120 illustrated in FIG. 6, $K_{hmax}$ calculated as a correction coefficient in Step S220, Equation (15) represented above, and the current value stored in the storage variable (that is, the current value of the measurement interval adjustment parameter S) (Step S230). For example, in the case of n=1, the arithmetic operation processing unit 9 calculates $\Delta h_{rx}(h_{rx\_min})$ as a first interval corresponding to the first target point in the process of Step S230. In this case, the arithmetic operation processing unit 9, in the process of Step S230, calculates $\Delta h_{rx}(h_{rx\_min})$ as a first interval corresponding to the first target point based on the value stored in the storage variable and $K_{hmax}(h_{rx\_min})$ calculated as the correction coefficient corresponding to the first target point. For example, in the case of n≥2, in the process of Step S230, the arithmetic operation processing unit 9 calculates $\Delta h_{rx}(h_{rx,n-1})$ as a first interval corresponding to the first target point. In this case, the arithmetic operation processing unit 9, in the process of Step S230, calculates $\Delta h_{rx}(h_{rx,n-1})$ as a first interval corresponding to the first target point based on the value stored in the storage variable and $K_{hmax}(h_{rx,n-1})$ calculated as the correction coefficient corresponding to the first target point.

Next, the arithmetic operation processing unit 9 calculates a position of the second target point based on the first interval calculated in Step S230 (Step S240). For example, in the case of n=1, the arithmetic operation processing unit 9, in Step S240, calculates $h_{rx,1}$ acquired by adding $\Delta h_{rx}(h_{rx\_min})$ calculated as the first interval corresponding to the first target point to $h_{rx\_min}$ as a position of the second target point based on Equation (16) represented above. In addition, for example, in the case of N≥2, the arithmetic operation processing unit 9, in Step S240, calculates $h_{rx,n}$ acquired by adding $\Delta h_{rx}(h_{rx,n-1})$ calculated as the first interval corresponding to the first target point to $h_{rx,n-1}$ as a position of the second target point based on Equation (16) represented above.

Next, the arithmetic operation processing unit 9 determines whether or not a predetermined end condition is satisfied (Step S250). In this example, the predetermined end condition is the position of the second target point calculated in Step S240 being outside the measurement range. In this case, the calculation processing unit 9 determines whether or not the position of the second target point calculated in Step S240 is outside the measurement range based on the measurement condition information read in Step S120 illustrated in FIG. 6 in Step S250. In addition, the predetermined end condition may be another condition.

In a case in which it is determined that the predetermined end condition is not satisfied (Step S250—No), the arithmetic operation processing unit 9 causes the process to transition to Step S210 and selects a next value of n.

On the other hand, in a case in which it is determined that the predetermined end condition is satisfied (Step S250—Yes), in other words, in a case in which it is determined that the position of the second target point calculated in Step S240 is outside the measurement range, the arithmetic operation processing unit 9 eliminates this position (Step S260). Then, the arithmetic operation processing unit 9 ends the repeated processes of Step S210 to Step S260 and causes the process to transition to Step S270.

In accordance with the repeated processes of such Step S210 to Step S260, the arithmetic operation processing unit 9 calculates positions of target points of the same number as the number of times of repetition of the processes of Step S220 to Step S260. In accordance with this, the computer 7 can inhibit an unnecessary increase of the number of target points and, as a result, can inhibit an increase of the number of target measurement points. In other words, the computer 7 can inhibit an increase of a time required for a radiant interference wave test.

After the process of Step S260 is performed, the arithmetic operation processing unit 9 identifies positions of two or more target measurement points based on the positions of a plurality of target points that have been calculated until now (Step S270). In other words, the arithmetic operation processing unit 9 identifies arrangement of two or more target measurement points in accordance with the process of Step S270. Here, the process of Step S270 will be described.

For example, the arithmetic operation processing unit 9 identifies all the positions of a plurality of target points calculated until now as positions of two or more target measurement points. In addition, the arithmetic operation processing unit 9 may be configured to identity some of positions of a plurality of target points calculated until now as positions of two or more target measurement points and identify positions of target points that have not been identified as the target measurement points of the positions of the plurality of target points that have been calculated until now as positions of interpolation points. Here, the interpolation points are virtual points representing positions at which electric field intensities are estimated through application of a low pass filter or the like when a distribution of the electric field intensity of a radiant interference wave is estimated. In addition, the interpolation points are virtual points positioned between two target measurement points adjacent to each other among a plurality of target measurement points. In a case in which the arithmetic operation processing unit 9 sets interpolation points between two or more target measurement points, a method for identifying positions of the interpolation points positioned between two or more target measurement points using the arithmetic operation processing unit 9 may be a known method or may be a method to be developed from now on.

In addition, in Step S270, after positions of two or more target measurement points are identified as arrangement of two or more target measurement points, the arithmetic operation processing unit 9 may be configured to set interpolation points between two or more target measurement points that have been identified or may be configured not to set interpolation points between two or more target measurement points that have been identified.

After the process of Step S270 is performed, the arithmetic operation processing unit 9 ends the process of the flowchart illustrated in FIG. 7, in other words, the position identifying process of Step S140.

In this way, the computer 7 calculates positions of a plurality of target points and identifies positions of two or more target measurement positions based on the calculated positions of the plurality of target points.

<Method of Calculating Upper Limit Value of Measurement Interval of Radiant Interference Wave>

Hereinafter, a method of calculating an upper limit value of a measurement interval of a radiant interference wave will be described. Here, hereinafter, for simplification of description, a method of calculating an upper limit value of a measurement interval of a radiant interference wave in a circumferential direction of a measurement surface will be described. In addition, the method of calculating an upper limit value of a measurement interval of a radiant interference wave in the circumferential direction of a measurement surface may be applied as a method of calculating an upper limit value of a measurement interval of a radiant interference wave in a vertical direction of the measurement surface by representing a position in the vertical direction of the measurement surface using a zenith angle from a position through which the rotation axis of the turn table 4 passes among positions of the upper face of the turn table 4 instead of an azimuth angle representing a position in the circumferential direction of the measurement surface.

First, in order to describe the method of calculating an upper limit value of a measurement interval of a radiant interference wave in the circumferential direction of the measurement surface, equations representing an electric field intensity and a magnetic field intensity generated by a minute electric current wave source Il and an electric field intensity and a magnetic field intensity generated by a minute magnetic current wave source IS will be described. Here, I represents a current. In addition, 1 represents a length of a minute electric current wave source. S represent an area of a minute magnetic current wave source. Hereinafter, for the convenience of description, a measurement interval of a radiant interference wave in the circumferential direction of the measurement surface will be simply referred to as a measurement interval of the radiant interference wave in description.

Equations representing an electric field intensity and a magnetic field intensity generated by the minute electric current wave source Il can be derived based on electromagnetics as in the following Equation (17). In addition, equations representing an electric field intensity and a magnetic field intensity generated by the minute magnetic current wave source IS can be derived based on electromagnetics as in the following Equation (18). In addition, Equation (17) represents an electric field intensity and a magnetic field intensity generated by a minute electric current wave source Il that passes through the origin and flows in parallel with a Z-axis direction in a three-dimensional polar coordinate system. In addition, Equation (18) represents an electric field intensity and a magnetic field intensity generated by a minute magnetic current wave source IS that passes through the origin and flows in parallel with the Z-axis direction in the three-dimensional polar coordinate system.

$$E_r = \frac{Ile^{-jkr}}{j2\pi\omega\varepsilon}\left(\frac{1}{r^3} + \frac{jk}{r^2}\right)\cos\theta \qquad (17)$$

$$E_\theta = \frac{Ile^{-jkr}}{j4\pi\omega\varepsilon}\left(\frac{1}{r^3} + \frac{jk}{r^2} - \frac{k^2}{r}\right)\sin\theta$$

$$H_\phi = \frac{Ile^{-jkr}}{4\pi}\left(\frac{1}{r^2} + \frac{jk}{r}\right)\sin\theta$$

$$E_\phi = H_r = H_\theta = 0$$

$$E_\phi = -\frac{j\omega\mu ISe^{-jkr}}{4\pi}\left(\frac{1}{r^2} + \frac{jk}{r}\right)\sin\theta \qquad (18)$$

$$H_r = \frac{ISe^{-jkr}}{2\pi}\left(\frac{1}{r^3} + \frac{jk}{r^2}\right)\cos\theta$$

$$H_\theta = \frac{ISe^{-jkr}}{4\pi}\left(\frac{1}{r^3} + \frac{jk}{r^2} - \frac{k^2}{r}\right)\sin\theta$$

$$E_r = E_\theta = H_\theta = 0$$

Here, in Equation (17) represented above, E represents an electric field intensity at an observation point away from the minute electric current wave source Il by a distance r that is generated by the minute electric current wave source Il. In addition, in Equation (17) represented above, H represents a magnetic field intensity at an observation point away from the minute electric current wave source Il by a distance r that is generated by the minute electric current wave source Il. In Equation (18) represented above, E represents an electric field intensity at an observation point away from the minute magnetic current wave source IS by a distance r that is generated by the minute magnetic current wave source IS. In addition, in Equation (18) represented above, H represents a magnetic field intensity at an observation point away from the minute magnetic current wave source IS by a distance r that is generated by the minute magnetic current wave source IS. For this reason, in Equation (17) and Equation (18), r represents a distance from the origin to the observation point in the three-dimensional polar coordinate system. In addition, in Equation (17) and Equation (18), $\varphi$ represents an azimuth angle in the three-dimensional polar coordinate system. In Equation (17) and Equation (18), $\theta$ represents a zenith angle in the three-dimensional polar coordinate system. In addition, in Equation (17) and Equation (18), j represents an imaginary number unit. In Equation (17) and Equation (18), k represents a wave number of the minute electric current wave source Il. For this reason, k represents a wave number of a radiant interference wave generated by the minute electric current wave source Il. In Equation (17), $\varepsilon$ represents permittivity. In addition, in Equation (18), $\mu$ represents permeability.

Regarding deriving of Equation (17) and Equation (18) represented above, for example, detailed descriptions are presents in Chapter 2 (Basics of antenna) of Volume 2 (Antenna/Propagation) of Group 4 (Mobile/Wireless) of IEICE "Forest of Wisdom" (http://www.ieice-hbkb.org/) and the like, and thus further detailed description will be omitted.

Here, for simplification, a case in which each of the minute electric current wave source Il and the minute magnetic current wave source IS and the observation have the same height will be considered. In this case, the longer the distance r, the larger a difference between the distance r between each of the minute electric current wave source Il and the minute magnetic current wave source IS and the observation point and a wavelength of the radiant interference wave. In Equation (17) and Equation (18), the longer the distance r, the term of 1/r becomes larger than each of the term of $1/r^2$ and the term of $1/r^3$. This represents that the longer the distance r, it becomes more difficult for a change according to a change in the distance r to occur in the electric field intensity and the magnetic field intensity. In other words, the longer the distance r, the lower sensitivity of the electric field intensity and the magnetic field intensity with respect to a change in the distance r. On the other hand, the shorter the distance r, the smaller a difference between the distance r and the wavelength of the radiant interference wave. In Equations (17) and (18), the shorter the distance r, the larger the term of $1/r^2$ with respect to the term of 1/r. In addition, in Equations (17) and (18), the shorter the distance r, the larger the term of $1/r^3$ with respect to the term of $1/r^2$. This represents that the shorter the distance r, the easier a change of the electric field intensity and the magnetic field intensity according to a change in the distance r to the minute electric current wave source Il may occur. In other words, the shorter the distance r, the higher the sensitivity of the electric field intensity and the magnetic field intensity with respect to a change in the distance r.

In this way, in Equations (17) and (18), the sensitivity of the electric field intensity and the magnetic field intensity with respect to a change in the distance r changes in accordance with the length of the distance r. However, in Equation (3) represented above, a parameter for reflecting a change of the sensitivity of the electric field intensity and the magnetic field intensity with respect to a change in the distance r is not included. The reason for this is considered as being due to each of Fourier coefficients $(a_p a_q + b_q b_p)$, $(a_p b_q - a_q b_p)$ included in Equation (3) being handled as a simple constant. The reason for this is that coefficients of the sine function and the cosine function in Equations (17) and (18) correspond to coefficients of the sine function and the cosine function in the lowest stage of Equation (3) (that is, Fourier coefficients $(a_p a_q + b_q b_p)$ and $(a_p b_q - a_q b_p)$). In other words, the shorter the distance, the handling of the coefficients of the sine function and the cosine function in the lowest stage of Equation (3) as constants is considered to be less valid. In addition, the wavelength of the radiant interference wave becomes shorter as the frequency of the radiant interference wave becomes higher, and the wavelength becomes longer as the frequency of the radiant interference wave becomes lower. In other words, the frequency of the radiant interference wave being higher represents that the distance r becomes relatively longer with respect to the wavelength of the radiant interference wave. In addition, the frequency of the radiant interference wave being lower represents that the distance r becomes relatively shorter with respect to the wavelength of the radiant interference wave. Thus, the shorter the distance r relatively with respect to the wavelength of the radiant interference wave, in other words, the lower the frequency of the radiant interference wave, the less handling of the coefficients of the sine function and the cosine function in the lowest stage in Equation (3) as constants is considered to be valid. Thus, these coefficients are assumed to be periodic functions of the azimuth angle $\varphi$ from the electromagnetic wave source (that is, each of the minute electric current wave source Il and the minute magnetic current wave source IS) to the observation point. In accordance with this, these coefficients can be handled as Fourier series. The following Equation (19) is an equation that is acquired by modifying Equation (3) as a result of such handling.

$$E = \sum_{n=1}^{N} \sum_{l=1}^{\infty} (A_{nl} + jB_{nl}) \exp(jk_{n\phi}\phi_{nl}) \exp(jkr_n) \quad (19)$$

$$= \sum_{n=1}^{N} \sum_{l=1}^{\infty} (A_{nl} + jB_{nl}) \exp\left[jk_{n\phi}\left(\frac{kr_n}{k_{n\phi}} + \phi_{nl}\right)\right]$$

$$|E|^2 = \sum_{m=1}^{N} \sum_{n=1}^{N} \sum_{l=1}^{\infty} (A_{nl}A_{ml} + B_{ml}B_{nl})\cos\left(k_{n\phi}\left(\frac{kr_n}{k_{n\phi}} + \phi_{nl} - \frac{kr_m}{k_{m\phi}} - \phi_{ml}\right)\right) +$$

$$(A_{nl}A_{ml} - B_{ml}B_{nl})\sin\left(k_{n\phi}\left(\frac{kr_n}{k_{n\phi}} + \phi_{nl} - \frac{kr_m}{k_{m\phi}} - \phi_{ml}\right)\right)$$

$A_{nl}$, $A_{ml}$, $B_{nl}$, and $B_{ml}$ in Equation (19) represented above are Fourier coefficients. Each of $k_{n\phi}$ and $k_{m\phi}$ in Equation (19) is a spatial wave number with respect to the azimuth angle $\phi$ in a three-dimensional polar coordinate system, and $k_\phi = 2\pi f_\phi$. In addition, $f_\phi$ is a spatial frequency for the azimuth angle $\phi$. As represented in Equation (19), even in a case in which the coefficients of the sine function and the cosine function in the lowest stage of Equation (3) represented above are handled as Fourier series, it can be understood that the square of the electric field intensity can be represented as a sum of sine waves. When Equation (19) and Equation (3) are compared with each other, it can be understood that terms in proportional to $\phi_{nl}$ and $\phi_{ml}$, which do not appear in Equation (3), appear inside the phase of the sine function of Equation (19) and inside the phase of the cosine function of Equation (19).

In a case in which $k_{rn}/k_{r\phi}$ is sufficiently large with respect to $\phi_{nl}$, Equation (19) reduces to Equation (3). This represents that $k_{rn}/k_{r\phi}$ corresponds to a ratio between the wavelength of the radiant interference wave and the measurement interval of the radiant interference wave, and an increase of $k_{rn}/k_{r\phi}$ with respect to $\phi_{nl}$ represents an increase in the frequency of the radiant interference wave, in other words, the distance r becoming relatively long with respect to the wavelength of the radiant interference wave and the like. This represents that band restriction for a spatial frequency based on $k_n$ and $k_m$ is applied to the square of the electric field intensity represented in Equation (19). The arrangement represented by the arrangement information generated in the process of the flowchart illustrated in FIG. 6 is generated as arrangement in which such band restriction is reflected based on the sampling theorem described above. As a result, in this case, by performing a radiant interference wave test using the arrangement represented by the arrangement information generated in the process of the flowchart illustrated in FIG. 6, the radiant interference wave measuring device 100 can inhibit an increase of a time required for the radiant interference wave test while inhibiting degradation of estimation accuracy of a maximum field intensity position in the radiant interference wave test. In other words, in this case, the measurement interval of the radiant interference wave in the arrangement represented by the arrangement information generated in this process can be regarded as a measurement interval assuring high accuracy as the estimation accuracy of the maximum field intensity position.

On the other hand, in a case in which $k_{rn}/k_{r\phi}$ is sufficiently small with respect to $\phi_{nl}$, a term that is in proportional to $\phi_{nl}$ and $\phi_{ml}$ cannot be approximately ignored, and thus, Equation (19) does not reduce to Equation (3). This is because that it represents that $k_{rn}/k_{r\phi}$ corresponds to a ratio between the wavelength of the radiant interference wave and the measurement interval of the radiant interference wave, and a decrease of $k_{rn}/k_{r\phi}$ with respect to $\phi_{nl}$ represents a decrease in the frequency of the radiant interference wave, in other words, the distance r becoming relatively short with respect to the wavelength of the radiant interference wave and the like. As a result, band restriction for a spatial frequency based on $k_{n\phi}$ and $k_{m\phi}$ is applied to the square of the electric field intensity represented in Equation (19). In other words, when a maximum value that can be taken by $k_{n\phi}$ and $k_{m\phi}$ under such band restriction can be obtained, the radiant interference wave measuring device 100 can generate arrangement of two or more measurement points as arrangement in which such band restriction is reflected. The reason for this is that a reciprocal of this maximum value corresponds to a maximum interval that can be taken as a measurement interval of the radiant interference wave in the azimuth angle direction on the measurement surface, that is, an upper limit value of the measurement interval of the radiant interference wave. In other words, the reason for this is that a reciprocal of this maximum value can be converted into a maximum interval that can be taken as a measurement interval of the radiant interference wave in the azimuth angle direction on the measurement surface (that is, a circumferential direction on the measurement surface), that is, an upper limit value of the measurement interval of the radiant interference wave. In addition, in such conversion, acquisition of this maximum value is equivalent to acquisition of a maximum value that can be taken by the spatial frequency for the azimuth angle $\phi$ under such band restriction. Hereinafter, for the convenience of description, a spatial frequency for the azimuth angle $\phi$ will be simply referred to as a spatial frequency, and a maximum value that can be taken by the spatial frequency under this band restriction will be referred to as a maximum spatial frequency in description.

Also the maximum spatial frequency can be calculated using a sampling theorem. However, such calculation is extremely complicated, and it is difficult to handle the calculation for an unskilled person. Thus, in this specification, description of calculation using a sampling theorem will be omitted, and, as an example, a method of more simply calculating a maximum spatial frequency will be described. This method is a method of estimating a maximum spatial frequency through a statistical analysis using Monte Carle method instead of the sampling theorem. In other words, this method is a method of estimating an upper limit value of the measurement interval of the radiant interference wave through a statistical analysis using the Monte Carle method instead of the sampling theorem. Hereinafter, for the convenience of description, this method will be referred to as a target estimating method.

According to the target estimating method, regardless of a magnitude relation of $k_{rn}/k_{r\phi}$ with respect to $\phi_{nl}$, a maximum spatial frequency can be estimated. For this reason, whether or not a maximum spatial frequency estimated using the target estimating method is valid can be determined by comparing the measurement interval of the radiant interference wave according to the maximum spatial frequency estimated using the target estimating method of a case in which $k_{rn}/k_{r\phi}$ is sufficiently small with respect to $\phi_{nl}$ and the maximum value of the measurement interval of the radiant interference wave of this case in which it is calculated in the process of the flowchart illustrated in FIG. 6 with each other.

In the target estimating method, first, a measurement target field intensity distribution generated by two electromagnetic wave sources is estimated. The reason for this is that Equation (19) represented above is calculated based on two electromagnetic wave sources. Here, in the estimation of the measurement target field intensity distribution according to the target estimating method, positions of two electromagnetic wave sources can be randomly given inside the electromagnetic wave source area described above. Then, in the target estimating method, randomly giving positions of two electromagnetic wave sources is repeated for a number of times determined in advance, and, every time the positions of two electromagnetic wave sources are randomly given, a measurement target field intensity distribution is estimated based on the given positions of two electromagnetic wave sources. In addition, in the target estimating method, estimation of a measurement target field intensity distribution of the number of times determined in advance is repeatedly performed every time the frequency of the radiant interference wave is changed while the frequency of the radiant interference wave generated from the two electromagnetic wave sources is changed. In the target estimating method, a maximum spatial frequency is estimated through a statistical analysis based on measurement target field intensity distributions corresponding to the number of times determined in advance that have been estimated for each frequency of the radiant interference wave in this way. In other words, in the target estimating method, an upper limit value of the measurement interval of the radiant interference wave is estimated through a statical analysis based on measurement target field intensity distributions of the number of times determined in advance that have been estimated for each frequency of the radiant interference wave in this way.

More specifically, in the target estimating method, as described below, a maximum spatial frequency is estimated. First, in the target estimating method, estimation of a measurement target field intensity distribution generated by two electromagnetic wave sources can be performed using at least one of Equation (17) and Equation (18) represented above. However, a maximum degree of the distance r is 3 in Equation (17). In addition, in Equation (17), the term of $1/r^3$ is included only in the equation of the electric field intensity. Also in Equation (18), a maximum degree of the distance r is 3. In Equation (18), the term of $1/r^3$ is included only in the equation of the magnetic field intensity. For this reason, estimation of a measurement target field intensity distribution generated by two electromagnetic wave sources is performed using any one of estimation of an electric field intensity using Equation (17) and estimation of a magnetic field intensity using Equation (18), and thus the estimation can be performed with sufficiently high accuracy. Thus, hereinafter, as an example, in the target estimating method, a case in which estimation of a measurement target field intensity distribution generated by two electromagnetic wave sources is performed by performing estimation of an electric field intensity using Equation (17) will be described. A general electromagnetic wave source is acquired by adding minute electromagnetic wave sources. For this reason, using a minute electromagnetic wave source as a model of a general electromagnetic wave source is considered to be valid.

In Equation (17), a position, orientation, an amplitude, a phase, and a wave number of an electromagnetic wave source are included as parameters representing a minute electromagnetic wave source. Thus, in estimation of a measurement target field intensity distribution generated by two electromagnetic wave source in the target estimating method, when the Monte Carle method is used, the orientation, the amplitude, and the phase of each of the two electromagnetic wave sources are randomly given together with the positions of the two electromagnetic wave sources. In addition, as described above, in the target estimating method, the wave number of each electromagnetic wave source, that is, the frequency of the radiant interference wave is given separated from the positions, the orientations, the amplitudes, and the phase of the two electromagnetic wave sources. In other words, in the target estimating method, every time the wave number of the electromagnetic wave source is changed, in accordance with the Monte Carle method in which the positions, the orientations, the amplitudes, and the phases of two electromagnetic wave sources are randomly given, estimation of a measurement target field intensity distribution is performed the number of times determined in advance. In addition, the number of times determined in advance may be any number of times as long as it is two or more times. However, the greater the number of times determined advance, the higher the estimation accuracy of a maximum spatial frequency in the target estimating method.

Hereinafter, as an example, a case in which a random number used for randomly changing positions, orientations, amplitudes, and phases of two electromagnetic wave sources is a random number having a uniform distribution will be described. Regarding the amplitudes of the two electromagnetic wave sources, relative values of the two electromagnetic wave sources are important. For this reason, the setting of an upper limit value of the random number is not important. Thus, hereinafter, as an example, a case in which this upper limit value is 1 will be described. In addition, each of the orientation and the phase of the electromagnetic wave source is periodical. For this reason, each of the orientation and the phase of the electromagnetic wave source is set with one time of rotation as an upper limit. In addition, in the target estimating method of this example, a maximum spatial frequency for the azimuth angle $\varphi$ is estimated. For this reason, in the target estimating method, the measurement surface may be handled as a circumference surrounding two electromagnetic wave sources. In accordance with this, the computer 7 can reduce a load required for the arithmetic operation. Thus, hereinafter, as an example, a case in which the measurement surface is handled as a circumference surrounding two electromagnetic wave sources will be described. Hereinafter, for the convenience of description, a circle having such a circumference will be referred to as a measurement circle in description. For example, a circumference of the measurement circle is a circumference of a circle of a cross-section acquired by cutting the measurement surface along a horizontal face.

Figure 8:
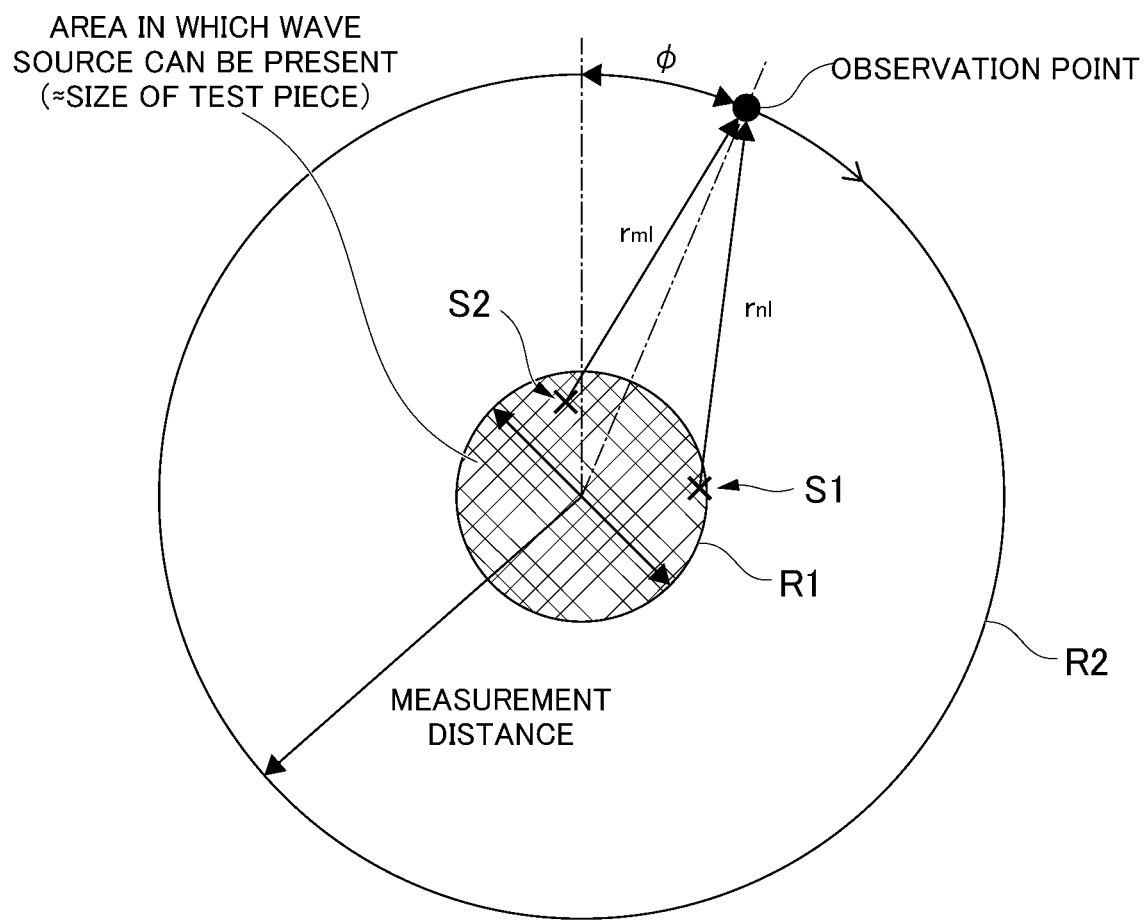
FIG. 8 is a diagram illustrating an example of a positional relation between two electromagnetic wave sources positioned inside an electromagnetic wave source area and observation points positioned on a circumference of a measurement circle.

FIG. 8 is a diagram illustrating an example of a positional relation between two electromagnetic wave sources positioned inside an electromagnetic wave source area and observation points positioned on a circumference of a measurement circle. In addition, FIG. 8 is a diagram illustrating an example of an electromagnetic wave source area seen in the direction of gravity. In FIG. 8, a hatched area R1 illustrates an example of an electromagnetic wave source area. A circumference R2 illustrated in FIG. 8 illustrates an example of a circumference of a measurement circle. A position S1 illustrated in FIG. 8 illustrates an example of a position of one of two electromagnetic wave sources. A position S2 illustrated in FIG. 8 illustrates an example of a position of the other of two electromagnetic wave sources. In other words, in the Monte Carle method using Equation (17), for each one time of estimation of an electric field intensity, positions, orientations, amplitudes, and phases of two electromagnetic wave sources inside the area R1 are randomly changed. In addition, $r_{n1}$ represented in FIG. 8 represents a distance from an electromagnetic wave source positioned at the position S1 to an observation point. Furthermore, $r_{ml}$ illustrated in FIG. 8 represents a distance from an electromagnetic wave source positioned at the position S1 to an observation point.

Figure 9:
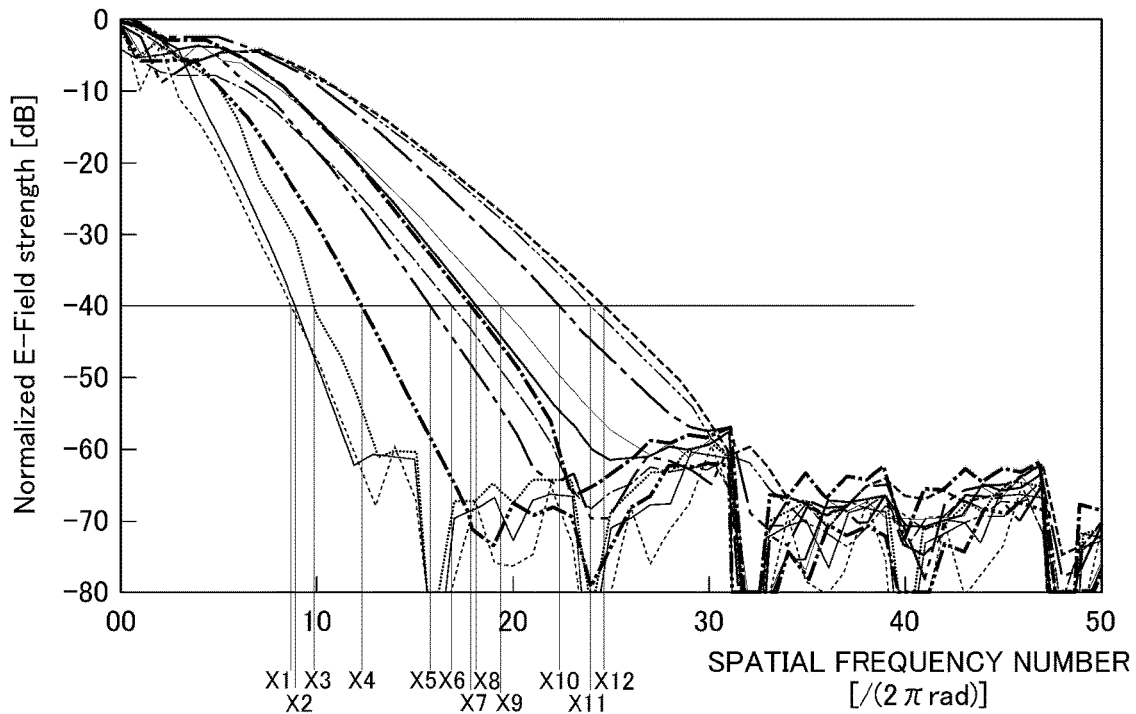
FIG. 9 is a diagram illustrating an example of a spatial frequency spectrum corresponding to each of a plurality of measurement target field intensity distributions estimated using a target estimating method in a case in which a frequency of radiant interference waves matches a certain frequency.

In the target estimating method, by using the Monte Carle method according to a method of giving parameters as described above, a plurality of measurement target field intensity distributions are estimated. The measurement target field intensity distribution estimated in this way can be transformed into a spectrum for a spatial frequency through a Fourier transform. Hereinafter, for the convenience of description, such a spectrum will be referred to as a spatial frequency spectrum in description. FIG. 9 is a diagram illustrating an example of a spatial frequency spectrum corresponding to each of a plurality of measurement target field intensity distributions estimated using a target estimating method in a case in which a frequency of a radiant interference wave matches a certain frequency. In the graph illustrated in FIG. 9, a vertical axis represents a magnitude of an electric field intensity for a direct current (DC) component using dB. In this graph, a horizontal axis represents a spatial frequency normalized using 360° (in other words, 2π [rad]). A plurality of curves plotted in this graph illustrates an example of a spatial frequency spectrum according to each of a plurality of measurement target field intensity distribution estimated using the target estimating method in this case.

In the target estimating method, in accordance with the graph as illustrated in FIG. 9, in all the spatial frequency spectrums, a spatial frequency of a case matching a threshold determined in advance among magnitudes of the electric field intensities is identified. In the example illustrated in FIG. 9, the threshold determined in advance is −40 [dB]. For this reason, in this example, spatial frequencies identified in this way are 12 spatial frequencies including a spatial frequency X1 to a spatial frequency X12. In other words, in the example illustrated in FIG. 9, the above-described number of times determined in advance is 12. In addition, a threshold determined in advance can be determined as a maximum value of a magnitude of a degree that can be ignored in a radiant interference wave test among magnitudes of electric field intensities of radiant interference waves. For this reason, there is arbitrariness in the method of determining a threshold determined in advance. In other words, the threshold determined in advance may be smaller than −40 [dB] or may be larger than −40 [dB]. In addition, the threshold determined in advance may be determined such that the estimation accuracy of a maximum field intensity position is high through an in-advance test or the like.

Thereafter, in the target estimating method, a central value μ and a dispersion σ of 12 spatial frequencies identified in this way are calculated. The central value μ may be a median value of these 12 spatial frequencies or may be an average value of these 12 spatial frequencies. In the target estimating method, a spatial frequency deviating by +3σ from the calculated central value μ is estimated as a maximum spatial frequency. This is for setting a confidence interval to be 99.9%.

Figure 10:
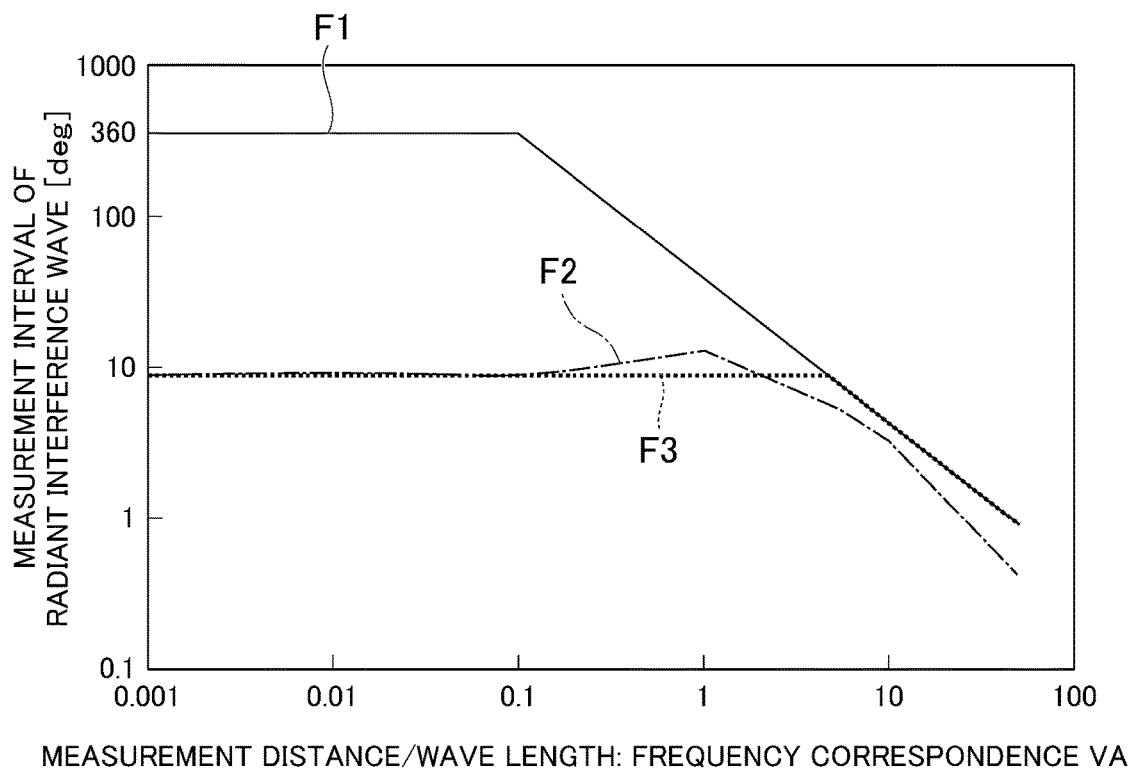
FIG. 10 is a diagram illustrating an example of a relation between a measurement interval of radiant interference waves according to a maximum spatial frequency and a frequency of the radiant interference waves for each frequency of the radiant interference waves.

In the target estimating method, for each wave number of the radiant interference wave, such a maximum spatial frequency is estimated. For this reason, in the target estimating method, a graph as illustrated in FIG. 10 can be generated. FIG. 10 is a diagram illustrating an example of a relation between a measurement interval of a radiant interference wave according to a maximum spatial frequency and a frequency of the radiant interference wave for each frequency of the radiant interference wave. In the graph illustrated in FIG. 10, a vertical axis represents a value acquired by multiplying a reciprocal of a maximum spatial frequency estimated by the target estimating method by a safety ratio of 4/5 as a measurement interval of the radiant interference wave acquired in accordance with the maximum spatial frequency estimated using the target estimating method. For this reason, the value of this vertical axis becomes closer to 0.1 as the maximum spatial frequency becomes higher (in other words, as the measurement interval of the radiant interference wave becomes smaller) and becomes closer to 1000 as the maximum spatial frequency becomes lower (in other words, the measurement interval of the radiant interference wave becomes larger). In addition, in this graph, the horizontal axis represents a value acquired by dividing a measurement distance that is a distance from the rotation axis of the turn table 4 to an observation point by a wavelength of the radiant interference wave determined in accordance with the frequency of the radiant interference wave. For this reason, the value of this horizontal axis becomes closer to 0.001 as the frequency of the radiant interference wave becomes lower and becomes closer to 100 as the frequency of the radiant interference wave becomes higher. Hereinafter, for the convenience of description, the value of this horizontal axis will be referred to as a frequency correspondence value in description. In addition, the safety ratio described above may be smaller than 4/5 or may be larger than 4/5 instead of 4/5.

In addition, a curve F1 plotted in the graph illustrated in FIG. 10 illustrates an example of changes in the maximum value of the measurement interval of the radiant interference wave calculated in the process of the flowchart illustrated in FIG. 6 with respect to changes in the frequency correspondence value. In addition, since one measurement point needs to be set even in the worst case, an upper limit value of the curve F1 (that is, an upper limit value of the measurement interval of the radiant interference wave) is 360° (in FIG. 10, illustrated as 360 [deg]). In addition, a curve F2 plotted in this graph illustrates an example of changes in the maximum spatial frequency estimated using the target estimating method with respect to changes in the frequency correspondence value. As illustrated in FIG. 10, the curve F2 approaches the curve F1 in an area in which the frequency correspondence value is high (that is, an area in which the frequency of the radiant interference wave is high). Here, an area in which the frequency correspondence value is high can be rephrased as an area in which $k_{rn}/k_{r\varphi}$ is sufficiently small with respect to $\varphi_{nl}$. The curve F2 approaching the curve F1 in this area represents that a maximum value of the measurement interval of the radiant interference wave according to the maximum spatial frequency estimated using the target estimating method and a maximum value of the measurement interval of the radiant interference wave of this case in which it is calculated in the process of the flowchart illustrated in FIG. 6 become close to each other in a case in which the frequency of the radiant interference wave is high. In accordance with this, estimation of the maximum spatial frequency according to the target estimating method can be considered to be valid. However, in an area in which the frequency correspondence value is low (that is, an area in which the frequency of the radiant interference wave is low), the curve F2 is greatly separated from the curve F1. This represents that, in an area in which the frequency correspondence value is low, in a case in which the measurement interval of the radiant interference wave is determined based on the maximum spatial frequency estimated using the target estimating method, the estimation accuracy of the maximum field intensity position is higher than that acquired in the process of the flowchart illustrated in FIG. 6. In this graph, the curve F1 is positioned on the lower side of the curve F2 as a whole. For this reason, by determining the measurement interval of the radiant interference wave based on the frequency of the radiant interference wave and the curve F2, the radiant interference wave measuring device 100 can estimate a measurement target field intensity distribution with high accuracy while inhibiting an increase of a time required for a radiant interference wave test for the radiant interference wave having a frequency included in a wider frequency band.

However, determination of the measurement interval of the radiant interference wave based on the frequency of the radiant interference wave and the curve F2 every time a radiant interference wave test is performed may increase the complication of the process. The reason for this is that the shape of the curve F2 does not have a simple shape such as a combination of two lines. Thus, as will be described below, the radiant interference wave measuring device 100 can identify a curve F3 that represents an upper limit value of the measurement interval of the radiant interference wave in an area in which the frequency correspondence value is low based on the curve F2 and matches the curve F1 in an area in which the frequency correspondence value is high. In other words, the curve F3 is a curve that approaches the curve F2 in an area in which the frequency correspondence value is high and approaches the curve F1 in an area in which the frequency correspondence value is low. In FIG. 10, an example of such a curve F3 is plotted.

For example, in order to identify the curve F3, the radiant interference wave measuring device 100 identifies an area in which the curve F1 does not approximately change and calculates an average value of values of maximum spatial frequencies on the curve F1 inside the identified area. In a case in which an upper limit value of the measurement interval of the radiant interference wave is identified using the curve F3, an average value of these values becomes an upper limit value of the measurement interval of the radiant interference wave. After the average value of these values is calculated, the radiant interference wave measuring device 100 identifies a line that is horizontal to the horizontal axis passing through the calculated average value and identifies an intersection between this line and the curve F1. Then, the radiant interference wave measuring device 100 identifies a line connecting a high frequency-side part of the identified intersection among parts of the curve F2 and this line as the curve F3. In addition, the method for identifying the curve F3 may be any other method instead of this. Furthermore, for example, the curve F3 may be manually determined by a user of the radiant interference wave measuring device 100 based on the graph as illustrated in FIG. 10.

By using the curve F3 identified in this way, the radiant interference wave measuring device 100 can select an upper limit value of the measurement interval of the radiant interference wave represented by the curve F3 as a measurement interval of the radiant interference wave in an area in which the frequency correspondence value is low and select a measurement interval of the radiant interference wave represented by the curve F3, that is, a measurement interval of the radiant interference wave represented by the curve F1, in an area in which the frequency correspondence value is high. As a result, the radiant interference wave measuring device 100 can estimate a measurement target field intensity distribution with high accuracy while inhibiting an increase of a time required for a radiant interference wave test for the radiant interference wave having a frequency included in a wider frequency band.

Figure 11:
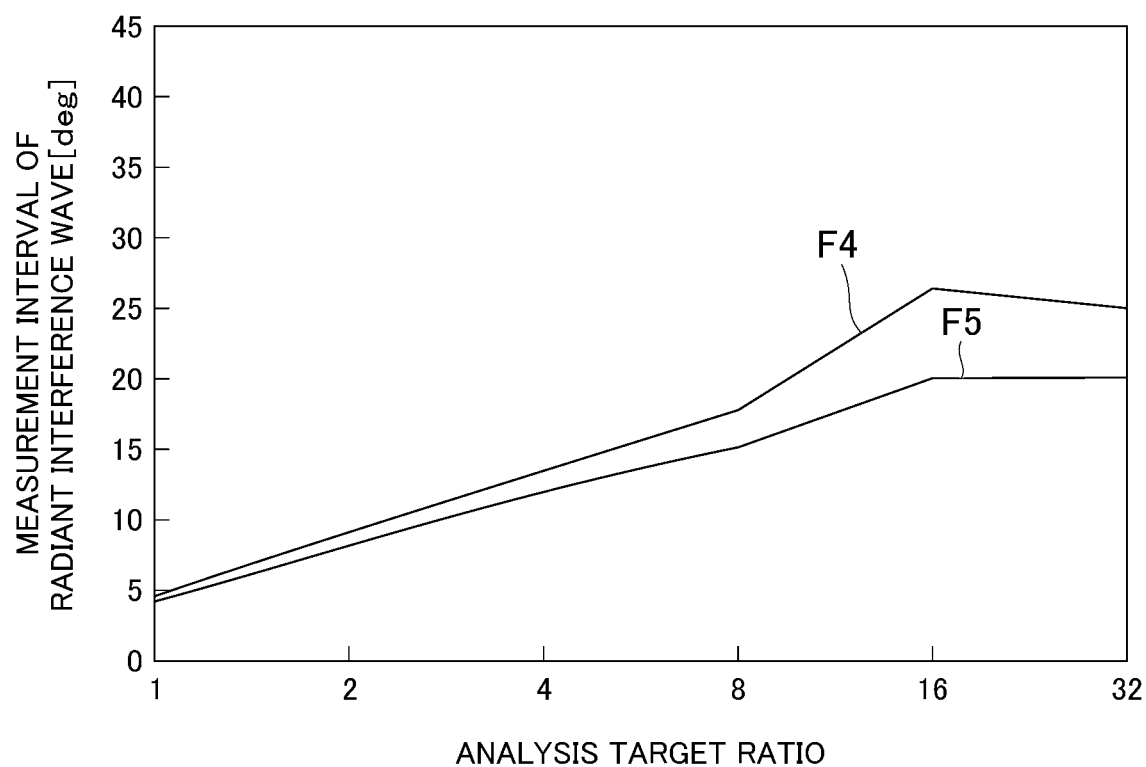
FIG. 11 is a diagram illustrating an example of a change of a value of a spatial frequency spectrum according to a change of an analysis target ratio of a case in which a horizontal-axis value of the graph illustrated in FIG. 10 is 0.001.

In addition, the curve F2 plotted in the graph illustrated in FIG. 10 changes in accordance with a ratio between a measurement distance that is a distance from the rotation axis of the turn table 4 to an observation point in the horizontal direction and a radius of the electromagnetic wave source area. Hereinafter, for the convenience of description, this ratio will be referred to as an analysis target ratio in description. The curve F2 illustrated in FIG. 10 is a curve acquired as a result of estimation of a measurement target field intensity distribution using the target estimating method in a case in which the analysis target ratio is 2. FIG. 11 is a diagram illustrating an example of a change of a value of a spatial frequency spectrum according to a change of an analysis target ratio of a case in which a horizontal-axis value of a graph illustrated in FIG. 10 is 0.001. In the graph illustrated in FIG. 11, the vertical axis is the same as the vertical axis in the graph illustrated in FIG. 10 and represents a measurement interval of the radiant interference wave. In this graph, the horizontal axis represents an analysis target ratio.

Here, a curve F4 plotted in the graph illustrated in FIG. 11 illustrates an example of changes of the measurement interval of the radiant interference wave determined in accordance with a maximum spatial frequency estimated using the target estimating method with respect to a change of the analysis target ratio in a case in which the frequency correspondence value is 0.001. The curve F4 represents that a measurement interval of the radiant interference wave approximately linearly changes up to an analysis target ratio of 16. In addition, the curve F4 illustrates that the measurement interval of the radiant interference wave becomes an approximately constant value for the analysis target ratio of 16 or more. Here, all the measurement intervals of the radiant interference wave represented by points on a curve positioned on a lower side of the curve F4 as a whole in this graph are measurement intervals for which a maximum field intensity position of a case in which the frequency correspondence value is 0.001 can be estimated with high accuracy. In addition, the frequency correspondence value being 0.001 is close to a lowest frequency as a frequency of the radiant interference wave that can be measured in a radiant interference wave test of the current stage. For this reason, by plotting a curve, which approaches the curve F4 and is positioned on a lower side of the curve F4 as a whole in this graph, in this graph, correspondence information associating an upper limit value of the measurement interval of the radiant interference wave and an analysis target ratio with each other for which the measurement target field intensity distribution can be estimated with high accuracy while inhibiting an increase of a time required for the radiant interference wave test can be generated. A curve F5 illustrated in FIG. 11 illustrates an example of a curve that approaches the curve F4 and is positioned on the lower side of the curve F4 as a whole in this graph. By using such correspondence information, the radiant interference wave measuring device 100 can easily identify an upper limited value of the measurement interval of the radiant interference wave according to the received analysis target ratio. This is a method simpler than the method using the curve F3 described above and is useful in a radiant interference wave test. In addition, the radiant interference wave measuring device 100 may perform plotting of the curve F5 in this graph, for example, in accordance with an operation received from a user or using various processes based on the curve F4. These various processes, for example, may be a process of plotting a curve that linearly changes in the range of 1 to 16 as an analysis target ratio and thereafter exhibits a constant value as a curve F5. In this case, an inclination of the linearly changing part of the curve F5, for example, is a value acquired by multiplying the inclination of the curve F4 in the range of 1 to 16 as an analysis target ratio by a predetermined ratio or may be a value determined using another method instead of this. The predetermined ratio, for example, is 0.9 and may be a ratio lower than 0.9 or may be ratio higher than 0.9.

In addition, in the target estimating method described above, although the Monte Carle method is used, instead of this, for example, a configuration in which a plurality of different test pieces are actually prepared, and a plurality of spatial frequency spectrums are calculated by measuring a measurement target field intensity distribution for each of the plurality of prepared test pieces may be used. Also in this case, the radiant interference wave measuring device 100 can identify curves such as the curve F3, the curve F5, and the like using the same method as the method described above, in other words, using a statistical analysis. As a result, the radiant interference wave measuring device 100 can calculate (identify) an upper limit value of the measurement interval of the radiant interference wave. In other words, also in this case, the radiant interference wave measuring device 100 can estimate a measurement target field intensity distribution with high accuracy while inhibiting an increase of a time required for a radiant interference wave test for a radiant interference wave having a frequency included in a wider frequency band.

<Process of Calculating Upper Limit Value of Measurement Interval of Radiant Interference Wave in Radiant Interference Wave Measurement>

Figure 12:
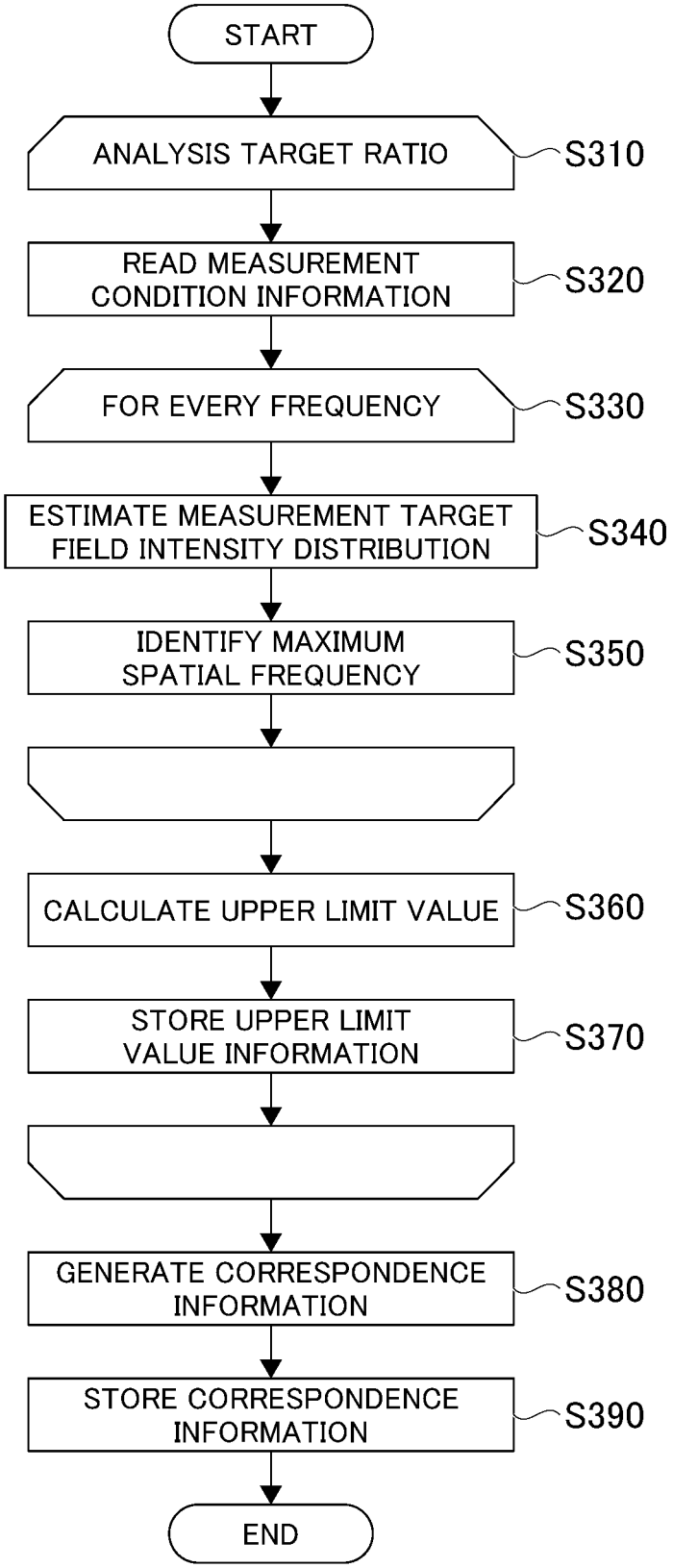
FIG. 12 is a diagram illustrating an example of a flow of a process of the radiant interference wave measuring device 100 calculating an upper limit value of a measurement interval of radiant interference waves.

Hereinafter, a process of calculating an upper limit value of the measurement interval of the radiant interference wave using the radiant interference wave measuring device 100 will be described with reference to FIG. 12. FIG. 12 is a diagram illustrating an example of a flow of a process of the radiant interference wave measuring device 100 calculating an upper limit value of a measurement interval of a radiant interference wave. Hereinafter, as an example, a case in which, at a timing before the process of Step S110 illustrated in FIG. 12, an operation for causing the radiant interference wave measuring device 100 to start a process of calculating an upper limit value of the measurement interval of the radiant interference wave is received by the radiant interference wave measuring device 100 will be described. In addition, hereinafter, as an example, a case in which analysis target ratio information representing a plurality of analysis target ratios different from each other determined in advance is stored in the recording medium 15 of the storage device 13 at this timing will be described. The plurality of analysis target ratios different from each other, for example, are individual integers included in a closed section of 1 to 32 and may have different values instead of these. In addition, hereinafter, as an example, a case in which frequency information representing a plurality of frequencies different from each other is stored in the recording medium 15 of the storage device 13 at this timing will be described. Hereinafter, as an example, a case in which the measurement condition information described above is stored in the recording medium 15 of the storage device 13 at this timing will be described.

The arithmetic operation processing unit 9 reads the analysis target ratio information stored in the recording medium 15 of the storage device 13 in advance from the storage medium 15 and repeatedly performs the processes of Steps S320 to S370 for each of a plurality of analysis target ratios represented by the read analysis target ratio information (Step S310).

After the analysis target ratio is selected in Step S310, the arithmetic operation processing unit 9 reads the measurement condition information stored in the recording medium 15 of the storage device 13 in advance from the recording medium 15 (Step S320).

Next, the arithmetic operation processing unit 9 reads frequency information stored in the recording medium 15 of the storage device 13 in advance from the recording medium 15. Then, the arithmetic operation processing unit 9 identifies each of a plurality of frequencies represented by the read frequency information as a frequency of the radiant interference wave and, for each identified frequency of the radiant interference wave, repeatedly performs the processes of Steps S340 to S350 (Step S330).

After the frequency of the radiant interference wave is selected in Step S330, the arithmetic operation processing unit 9 performs estimation of a measurement target field intensity distribution the number of times determined in advance using the measurement condition information read in Step S320 and the Monte Carle method in the target estimating method, and performs estimation of measurement target field intensity distributions of the number corresponding to the number of times (Step S340). Thereafter, in Step S340, the arithmetic operation processing unit 9 performs a Fourier transform of each of the estimated measurement target field intensity distributions corresponding to this number of times and calculates spatial frequency spectrums corresponding to this number of times. In addition, for example, in a case in which a size and the like of the electromagnetic wave source area are identified, the arithmetic operation processing unit 9 performs calculation, identifying, and the like based on the measurement condition information.

Next, the arithmetic operation processing unit 9 identifies a maximum spatial frequency according to the frequency of the radiant interference wave in Step S330 using the target estimating method based on the spatial frequency spectrums corresponding to the number of times, which is determined in advance, calculated in Step S340 (Step S350). After the maximum spatial frequencies are identified in Step S350, the arithmetic operation processing unit 9 causes the process to transition to Step S330 and selects a next frequency. In addition, after the transition to Step S330, in a case in which there is no frequency that has not been selected in Step S330, the arithmetic operation processing unit 9 ends the repeated processes of Steps S330 to S350 and causes the process to transition to Step S360.

After the repeated processes of Steps S330 to the S350 are ended, the arithmetic operation processing unit 9 calculates an upper limit value of the measurement interval of the radiant interference wave based on the maximum spatial frequency identified for each of a plurality of frequencies through these repeated processes using the target estimating method (Step S360).

Next, the arithmetic operation processing unit 9 stores upper limit value information representing the upper limit value of the measurement interval of the radiant interference wave calculated in Step S360 in the recording medium 15 of the storage device 13 in association with the analysis target ratio selected in Step S310 (Step S370). After storing the upper limit value information in Step S370, the arithmetic operation processing unit 9 causes the process to transition to Step S310 and selects a next analysis target ratio. In addition, after the transition to Step S310, in a case in which there is no analysis target ratio that has not been selected in Step S310, the arithmetic operation processing unit 9 ends the repeated processes of Steps S310 to S370 and causes the process to transition to Step S380.

After the repeated processes of Steps S310 to S370 are ended, the arithmetic operation processing unit 9 generates the correspondence information described above based on a plurality of pieces of upper limit information stored in the recording medium 15 of the storage device 13 in these repeated processes (Step S380).

Next, the arithmetic operation processing unit 9 stores the correspondence information generated in Step S380 in the recording medium 15 of the storage device 13 (Step S390) and ends the process of the flowchart illustrated in FIG. 12.

As described above, the radiant interference wave measuring device 100, based on the target estimating method, calculates an upper limit value of the measurement interval of the radiant interference wave according to the antenna 2 based on positions of a plurality of electromagnetic wave sources according to a test piece radiating a radiant interference wave and a relative positional relation between the antenna 2 measuring the radiant interference wave and the test piece. In accordance with this, the radiant interference wave measuring device 100 can estimate a measurement target field intensity distribution with high accuracy while inhibiting an increase of a time required for a radiant interference wave test for a radiant interference wave having a frequency included in a wider frequency band. As a result, the radiant interference wave measuring device 100 can estimate a maximum field intensity position with high accuracy while inhibiting an increase of a time required for a radiant interference wave test for the radiant interference wave having a frequency included in a wider frequency band.

<Process of the Radiant Interference Wave Measuring Device Estimating a Measurement Target Field Intensity Distribution Using an Upper Limit Value of the Measurement Interval of the Radiant Interference Wave>

Figure 13:
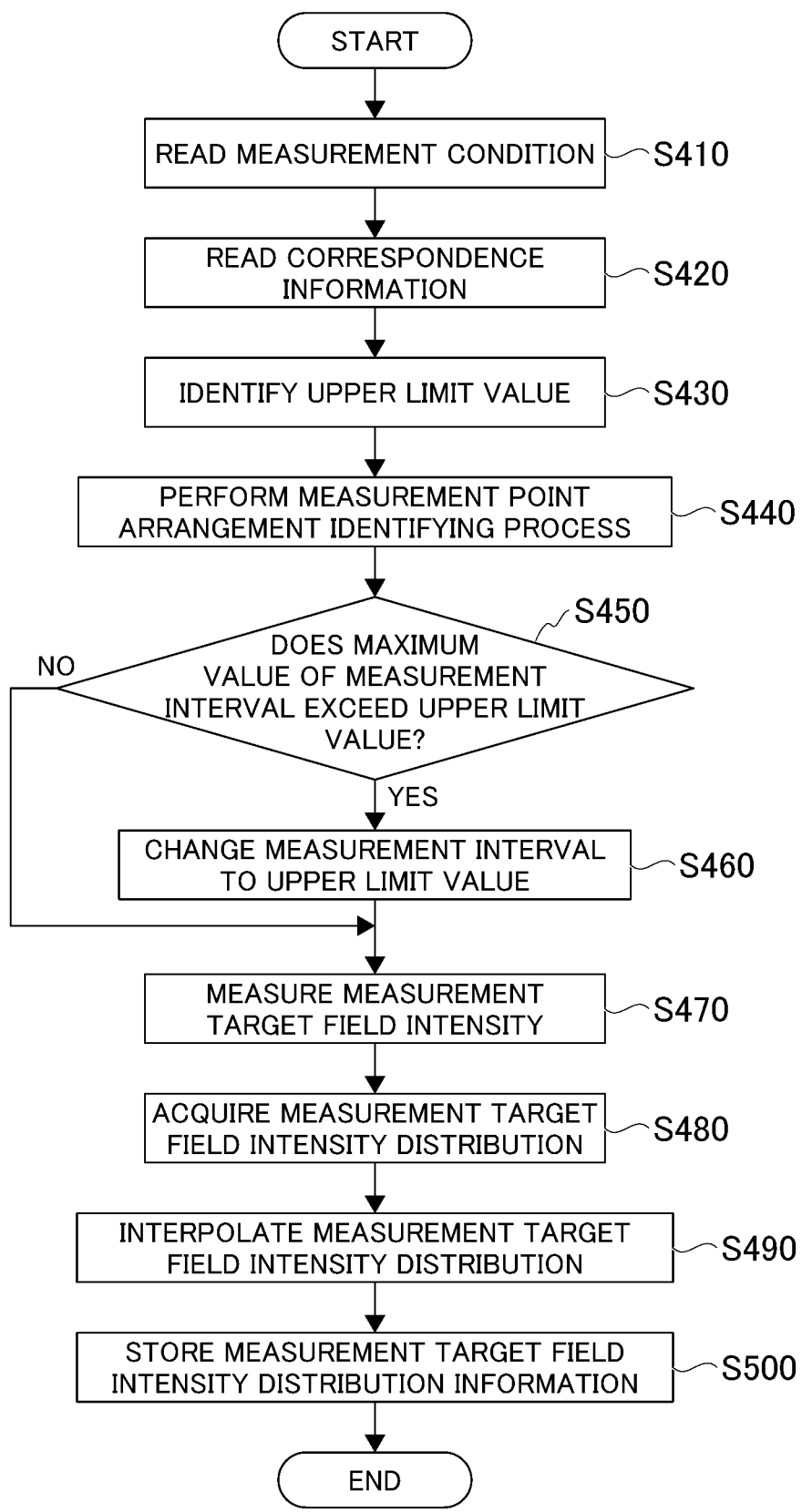
FIG. 13 is a diagram illustrating an example of a flow of a process of the radiant interference wave measuring device 100 estimating a measurement target field intensity distribution using an upper limit value of a measurement interval of radiant interference waves.

Hereinafter, the process of the radiant interference wave measuring device 100 estimating a measurement target field intensity distribution using an upper limit value of the measurement interval of the radiant interference wave will be described with reference to FIG. 13. FIG. 13 is a diagram illustrating an example of a flow of a process of the radiant interference wave measuring device 100 estimating a measurement target field intensity distribution using an upper limit value of a measurement interval of a radiant interference wave. Hereinafter, as an example, a case in which, at a timing before the process of Step S410 illustrated in FIG. 13, an operation for causing the radiant interference wave measuring device 100 to start a process of estimating a measurement target field intensity distribution using the upper limit value of the measurement interval of the radiant interference wave is received by the radiant interference wave measuring device 100 will be described. In addition, as an example, a case in which, at this timing, the process of the flowchart illustrated in FIG. 12 is performed, and the correspondence information is stored in the recording medium 15 of the storage device 13 will be described. Hereinafter, as an example, a case in which, at this timing, the measurement condition information is stored in the recording medium 15 of the storage device 13 will be described.

The arithmetic operation processing unit 9 reads the measurement condition information stored in the recording medium 15 of the storage device 13 in advance from the recording medium 15 (Step S410).

Next, the arithmetic operation processing unit 9 reads the correspondence information stored in the recording medium 15 of the storage device 13 in advance from the recording medium 15 (Step S420).

Next, the arithmetic operation processing unit 9 calculates an analysis target ratio based on the measurement condition information read in Step S410. Then, the arithmetic operation processing unit 9 identifies an upper limit value of the measurement interval of the radiant interference wave associated with this analysis target ratio based on the calculated analysis target ratio and the correspondence information read in Step S420 (Step S430).

Next, the arithmetic operation processing unit 9 calculates arrangement of two or more measurement points using the process of the flowchart illustrated in FIG. 6 (Step S440). In addition, reading of the measurement condition information has been completed in Step S410, and thus the arithmetic operation processing unit 9 may omit the process of Step S120 of this flowchart in the process of Step S440.

Next, the arithmetic operation processing unit 9 determines whether or not a maximum value of the measurement interval of the radiant interference wave in the arrangement calculated in Step S440 exceeds the upper limit value identified in Step S430 (Step S450).

In a case in which it is determined that the maximum value of the measurement interval of the radiant interference wave in the arrangement calculated in Step S440 is equal to or smaller than the upper limit value identified in Step S430 (Step S450—No), the arithmetic operation processing unit 9 determines this arrangement as arrangement of two or more measurement points set on the measurement surface. Then, the arithmetic operation processing unit 9 controls the controller 6 and the receiver 5 using the determined arrangement of two or more measurement points and performs measurement of a measurement target field intensity (in other words, actual measurement of a measurement target field intensity) at a measurement position represented by each of two or more measurement points represented by this arrangement (Step S470). In addition, the arithmetic operation processing unit 9 may be configured to calculate a measurement target field intensity at each measurement position through a simulation based on electromagnetics in Step S470.

Next, the arithmetic operation processing unit 9 acquires a measurement target field intensity distribution based on all the measurement target field intensities measured in Step S470 (Step S480). In other words, in Step S480, the arithmetic operation processing unit 9 estimates a measurement target field intensity distribution based on all the measurement target field intensities measured in Step S470.

Next, the arithmetic operation processing unit 9 interpolates the measurement target field intensity distribution acquired in Step S480 (Step S490). The arithmetic operation processing unit 9, for example, interpolates the measurement target field intensity distribution using a low pass filter in Step S490. In addition, in Step S490, the arithmetic operation processing unit 9, for example, uses a reciprocal of the measurement interval of the radiant interference wave as a cutoff frequency of the low pass filter. In addition, the arithmetic operation processing unit 9 may be configured to interpolate the measurement target field intensity distribution using a method other than the method using the low pass filter. Furthermore, the arithmetic operation processing unit 9 may be configured not to interpolate the measurement target field intensity distribution by omitting the process of Step S490.

Next, the arithmetic operation processing unit 9 generates measurement target field intensity distribution information representing the measurement target field intensity distribution interpolated in Step S490, stores the generated measurement target field intensity distribution information in the recording medium 15 of the storage device 13 (Step S500), and ends the process of the flowchart illustrated in FIG. 13.

On the other hand, in a case in which it is determined that the maximum value of the measurement interval of the radiant interference wave in the arrangement calculated in Step S440 exceeds the upper limit value identified in Step S430 (Step S450—Yes), the arithmetic operation processing unit 9 causes the process to transition to Step S470, uses the upper limit value as a measurement interval of the radiant interference wave, and determines arrangement of two or more measurement points according to the used measurement interval of the radiant interference wave as arrangement of two or more measurement points set on the measurement surface. Then, the arithmetic operation processing unit 9 controls the controller 6 and the receiver 5 using the determined arrangement of two or more measurement points and performs measurement of a measurement target field intensity (in other words, actual measurement of the measurement target field intensity) at the measurement position represented by each of two or more measurement points represented by this arrangement. In addition, as described above, the arithmetic operation processing unit 9 may be configured to calculate a measurement target field intensity at each measurement position through a simulation based on electromagnetics in Step S470.

As above, the radiant interference wave measuring device 100 selects the upper limit value as a measurement interval used in a radiant interference wave test measuring a radiant interference wave in a case in which the maximum value of the measurement interval of the radiant interference wave calculated in Step S440 exceeds the upper limit value identified in Step S430 and selects the measurement interval calculated in Step S440 as a measurement interval used in a radiant interference wave test in a case in which the maximum value of the measurement interval calculated in Step S440 is equal to or smaller than the calculated upper limit value. In other words, the radiant interference wave measuring device 100 can automatically convert such a measurement interval of the radiant interference wave without receiving an operation from a user. As a result, the radiant interference wave measuring device 100 can inhibit an increase of a work performed by a user in a radiant interference wave test in addition to estimation of the distribution of the magnetic field intensity of the radiant interference wave on the virtual surface surrounding a test piece with high accuracy while inhibiting an increase of a time required for a radiant interference wave test for the radiant interference wave having a frequency included in a wider frequency band.

Figure 14:
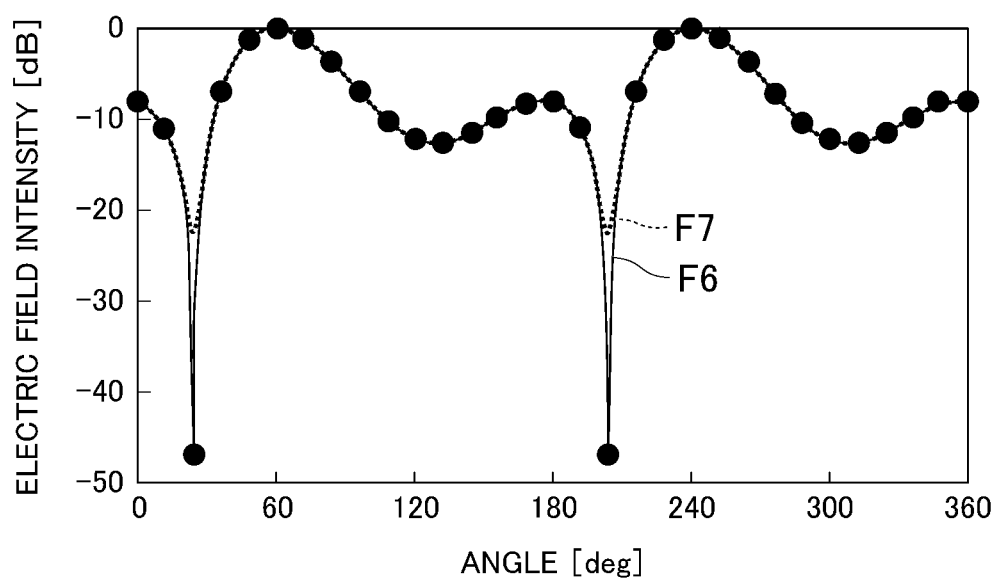

FIG. 14 is a diagram for a comparison between a measurement target field intensity distribution estimated in the process of the flowchart illustrated in FIG. 13 based on a certain measurement condition and an actual measurement target field intensity distribution estimated based on this measurement condition, a simulation based on electromagnetics, and the like. The frequency of the radiant interference wave in this measurement condition is 100 [kHz] that is an example of the frequency included in the area in which the frequency of the radiant interference wave is low described above. In the graph illustrated in FIG. 14, the vertical axis represents an electric field intensity. In addition, in this graph, the horizontal axis represents a position on the measurement surface having a cylindrical shape in the circumferential direction of the cylinder using an azimuth angle around the rotation axis of the turn table 4. A curve F6 plotted in this graph illustrates an example of an actual measurement target field intensity distribution estimated through a simulation or the like based on electromagnetics. In addition, a plurality of points plotted in this graph represent a plurality of measurement target field intensities measured in the process of the flowchart illustrated in FIG. 13 based on a certain measurement condition. As illustrated in FIG. 13, a plurality of these points are positioned on the curve F6. A measurement target field intensity distribution estimated through this process based on the plurality of these measurement target field intensities is represented using a curve F7 in this graph. Then, as illustrated in FIG. 13, the measurement target field intensity distribution represented by the curve F6 and the measurement target field intensity distribution represented by the curve F7 approximately overlap each other. More specifically, a maximum field intensity position of the measurement target field intensity distribution represented by the curve F6 and a maximum field intensity position of the measurement target field intensity distribution represented by the curve F7 match or approximately match each other. Thus, by estimating the measurement target field intensity distribution using the process of the flowchart illustrated in FIG. 13, the radiant interference wave measuring device 100 can estimate the measurement target field intensity distribution with high accuracy even in an area in which the frequency of the radiant interference wave is low. In other words, the radiant interference wave measuring device 100 can estimate a measurement target field intensity distribution with high accuracy while inhibiting an increase of a time required for a radiant interference wave test for a radiant interference wave having a frequency included in a wider frequency band.

Other Modified Example

In a case in which the computer 7 identifies arrangement of two or more measurement points not in the vertical direction but in the azimuth angle direction described above, the following Equation (20) is used instead of Equation (15) described above.

$$\Delta \theta_{rx} = \frac{\lambda S}{R_{max}} \qquad (20)$$

Here, $R_{max}$ of Equation (20) represented above represents a radius of upper and lower faces included in the test piece information as information representing the size of the test piece 1. These upper and lower faces are upper and lower faces of an area having the smallest cylindrical shape among virtual areas including the entire test piece 1 disposed on the turn table 4. In accordance with this, the computer 7 can identify arrangement of two or more measurement points also for the azimuth angle direction and, as a result, can estimate a measurement target field intensity distribution with high accuracy while inhibiting an increase of a time required for a radiant interference wave test. This arrangement is arrangement in the azimuth angle direction around the rotation axis (that is, the rotation axis of the turn table 4) determined in advance to be in parallel with the direction of gravity.

As above, the radiant interference wave measuring device 100 according to an embodiment calculates an upper limit value of the measurement interval of the radiant interference wave using the antenna 2 based on positions of a plurality of electromagnetic wave sources according to a test piece radiating a radiant interference wave and a relative positional relation between the antenna 2 measuring the radiant interference wave and the test piece. In accordance with this, the radiant interference wave measuring device 100 can estimate a measurement target field intensity distribution with high accuracy while inhibiting an increase of a time required for a radiant interference wave test for a radiant interference wave having a frequency included in a wider frequency band.

In addition, items described above may be combined in any form.

<Supplementary Note>

[1]

A computer-readable medium storing instructions which, when executed by a computer, cause the computer to execute a first calculation step of calculating an upper limit value of a measurement interval of radiant interference waves using an antenna based on positions of a plurality of electromagnetic wave sources according to a test piece radiating the radiant interference waves and a relative positional relation between the antenna measuring the radiant interference waves and the test piece.

[2]

The computer-readable medium described in [1], the measurement interval is an interval between measurement positions adjacent to each other among a plurality of measurement positions at which the radiant interference waves are measured by the antenna.

[3]

The computer-readable medium described in [1] or [2], causing the computer to further execute a second calculation step of calculating the measurement interval based on positions of the plurality of electromagnetic wave sources, the relative positional relation, a wavelength of the radiant interference waves, and a sampling theorem.

[4]

The computer-readable medium described in [3], causing the computer to further execute a selection step of selecting the upper limit value as the measurement interval used in a radiant interference wave test for measuring the radiant interference waves in a case in which a maximum value of the measurement interval calculated in the second calculation step exceeds the upper limit value calculated in the first calculation step and selecting the measurement interval calculated in the second step as the measurement interval used in the radiant interference wave test in a case in which the maximum value of the measurement interval calculated in the second calculation step is equal to or less than the upper limit value calculated in the first calculation step.

[5]

The computer-readable medium described in any one of [1] to [4], in which, in the first calculation step, the upper limit value is calculated based on a statistical analysis.

[6]

The computer-readable medium described in any one of [1] to [5], causing the computer to further execute a third calculation step of calculating at least one of a distribution of an electric field intensity of the radiant interference waves and a distribution of a magnetic field intensity of the radiant interference waves based on the upper limit value calculated in the first calculation step.

[7]

The computer-readable medium described in [6], causing the computer to further execute: an acquisition step of acquiring at least one of the distributions through a simulation or actual measurement; and an interpolation step of interpolating at least one of the distributions using a low pass filter.

[8]

An information processing method comprising a first calculation step of calculating an upper limit value of a measurement interval of radiant interference waves using an antenna based on positions of a plurality of electromagnetic wave sources according to a test piece radiating the radiant interference waves and a relative positional relation between the antenna measuring the radiant interference waves and the test piece.

[9]

The information processing method described in [8], in which the measurement interval is an interval between measurement positions adjacent to each other among a plurality of measurement positions at which the radiant interference waves are measured by the antenna.

[10]

The information processing method described in [8] or [9], further including a second calculation step of calculating the measurement interval based on positions of the plurality of electromagnetic wave sources, the relative positional relation, a wavelength of the radiant interference waves, and a sampling theorem.

[11]

The information processing method described in [10], further including a selection step of selecting the upper limit value as the measurement interval used in a radiant interference wave test for measuring the radiant interference waves in a case in which a maximum value of the measurement interval calculated in the second calculation step exceeds the upper limit value calculated in the first calculation step and selecting the measurement interval calculated in the second step as the measurement interval used in the radiant interference wave test in a case in which the maximum value of the measurement interval calculated in the second calculation step is equal to or less than the upper limit value calculated in the first calculation step.

[12]

The information processing method described in any one of [8] to [11], in which, in the first calculation step, the upper limit value is calculated based on a statistical analysis.

[13]

The information processing method described in any one of [8] to [12], further including a third calculation step of calculating at least one of a distribution of an electric field intensity of the radiant interference waves and a distribution of a magnetic field intensity of the radiant interference waves based on the upper limit value calculated in the first calculation step.

[14]

The information processing method described in [13], further including: an acquisition step of acquiring at least one of the distributions through a simulation or actual measurement; and an interpolation step of interpolating at least one of the distributions using a low pass filter.

[15]

An information processing device that calculates an upper limit value of a measurement interval of radiant interference waves using an antenna based on positions of a plurality of electromagnetic wave sources according to a test piece radiating the radiant interference waves and a relative positional relation between the antenna measuring the radiant interference waves and the test piece.

[16]

The information processing device described in [15], in which the measurement interval is an interval between measurement positions adjacent to each other among a plurality of measurement positions at which the radiant interference waves are measured by the antenna.

[17]

The information processing device described in [15] or [16], the measurement interval is calculated based on positions of the plurality of electromagnetic wave sources, the relative positional relation, a wavelength of the radiant interference waves, and a sampling theorem.

[18]

The information processing device described in [17], in which the upper limit value is selected as the measurement interval used in a radiant interference wave test for measuring the radiant interference waves in a case in which a maximum value of the calculated measurement interval exceeds the calculated upper limit value, and the calculated measurement interval is selected as the measurement interval used in the radiant interference wave test in a case in which the maximum value of the calculated measurement interval is equal to or less than the calculated upper limit value.

[19]

The information processing device described in any one of [15] to [18], in which a plurality of measurement positions at which the radiant interference waves are measured using the antenna are calculated such that the measurement interval satisfies a sampling theorem for a wavelength of the radiant interference waves based on positions of the plurality of electromagnetic wave sources and the relative positional relation.

[20]

The information processing device described in any one of [15] to [19], in which the upper limit value is calculated based on a statistical analysis.

[21]

The information processing device described in any one of [15] to [20], in which at least one of a distribution of an electric field intensity of the radiant interference waves and a distribution of a magnetic field intensity of the radiant interference waves is calculated based on the calculated upper limit value.

[22]

The information processing device described in [21], in which at least one of the distributions is acquired through a simulation or actual measurement, and at least one of the distributions is interpolated using a low pass filter.

As above, although the embodiment of the present disclosure has been described in detail with reference to the drawings, a specific configuration is not limited to this embodiment, and modifications, substitutions, omission, and the like may be performed in a range not departing from the concept of the present disclosure.

A program used for realizing any function of each device (for example, the radiant interference wave measuring device 100, the controller 6, the computer 7, and the like) described above may be recorded on a computer-readable recording medium, and a computer system may be caused to read and execute the program recorded on this recording medium. The "computer system" described here includes an OS and hardware such as peripherals. The "computer-readable recording medium" represents a portable medium such as a flexible disk, a magneto-optical disk, a ROM (Read Only Memory) or a CD (Compact Disk)-ROM, or a storage device such as a hard disk built into the computer system. In addition, the "computer-readable recording medium" may include a medium storing a program for a predetermined time such as a volatile memory (for example, an internal RAM) of a computer system serving as a server or a client in a case in which the program is transmitted through a network such as the Internet or a communication line such as a telephone line.

Furthermore, the program described above may be transmitted from a computer system storing the program in a storage device or the like to another computer system through a transmission medium or using transmission waves in a transmission medium. Here, the "transmission medium" transmitting the program represents a medium having a function of transmitting information such as a network (communication network) including the Internet and the like or a communication line including a telephone line.

In addition, the program described above may be used for realizing some of the functions described above. Furthermore, the program described above may be a program realizing the functions described above by being combined with a program recorded in the computer system in advance, a so-called a differential file (differential program).

EXPLANATION OF REFERENCES

1 Test piece
2 Antenna
3 Antenna mast
4 Turn table
5 Receiver
6 Controller
7 Computer
8 Control unit
9 Arithmetic operation processing unit
10 Main control unit
11 Input device
12 Output device
13 Storage device
14 Bus
15 Recording medium
100 Radiant interference wave measuring device

What is claimed is:

1. A non-transitory computer-readable medium comprising and storing instructions for controlling a radiant interference wave measuring device including an antenna for measuring the radiant interference wave at each of a plurality of measurement positions set on a virtual surface surrounding a test piece, wherein, the instructions include:
a measurement interval upper limit value calculating process to calculate a maximum allowable distance as a measurement interval, which is a distance between two spatially adjacent measurement positions in the plurality of measurement positions set on the virtual surface, as a upper limit value of the measurement interval,
a measurement position calculating process to calculate the plurality of measurement positions such that all of the measurement intervals do not exceed the upper limit value calculated by the measurement interval upper limit value calculating process,
a measurement position setting process to set the plurality of measurement positions calculated by measurement position calculating process on the virtual surface, a radiant interference wave measuring process to control the radiant interference wave measuring device, and measure the radiant interference wave at each of the plurality measurement positions set on the virtual surface by the measurement position setting process, wherein the measurement interval upper limit value calculating process calculates the upper limit value based on a positions of a plurality of electromagnetic wave sources according to the test piece radiating the radiant interference waves, and a relative positional relation between the antenna and the test piece, the test piece is a device radiating the radiant interference wave measured in the radiant interference wave test conducted under pre-determined test conditions and test methods, and the plurality of electromagnetic wave sources are wave sources of the radiant interference wave.

2. The non-transitory computer-readable medium according to claim 1, wherein the measurement position calculating process calculates the plurality of measurement positions based on the positions of the plurality of electromagnetic wave sources, the relative positional relation, and a wave length of the radiant interference wave.

3. The non-transitory computer-readable medium according to claim 2, wherein the measurement position calculating process changes the plurality of calculated measurement positions such that all of the measurement intervals are equal to the upper limit value, in a case in which a maximum value of the measurement interval included in the plurality of calculated measurement positions exceed the upper limit value, and does not change the plurality of calculated measurement positions, in a case in which maximum value of the measurement interval included in the plurality of calculated measurement positions do not exceed the upper limit value.

4. The non-transitory computer-readable medium according to claim 1, wherein the instructions include an intensity distribution calculating process that calculates at least one of a distribution of an electric field intensity of the radiant interference waves and a distribution of a magnetic field intensity of the radiant interference waves based on the upper limit value calculated by the measurement interval upper limit value calculating process.

5. The non-transitory computer-readable medium according to claim 4, wherein the instructions include:
a distribution acquiring process that acquires at least one of the distributions through a simulation or actual measurement; and
an interpolating process that interpolates at least one of the distributions using a low pass filter.

6. A controlling method of a computer for controlling a radiant interference wave measuring device including an antenna for measuring the radiant interference wave at each of a plurality of measurement positions set on a virtual surface surrounding a test piece, wherein, the controlling method comprises:
a measurement interval upper limit value calculating step that calculates a maximum allowable distance as a measurement interval, which is a distance between two spatially adjacent measurement positions in the plurality of measurement positions set on the virtual surface, as a upper limit value of the measurement interval,
a measurement position calculating step that calculates the plurality of measurement positions such that all of the measurement intervals do not exceed the upper limit value calculated by the measurement interval upper limit value calculating step,
a measurement position setting step that sets the plurality of measurement positions calculated by measurement position calculating step on the virtual surface,
a radiant interference wave measuring step that controls the radiant interference wave measuring device, and measures the radiant interference wave at each of the plurality measurement positions set on the virtual surface by the measurement position setting step, wherein the measurement interval upper limit value calculating step calculates the upper limit value based on a positions of a plurality of electromagnetic wave sources according to the test piece radiating the radiant interference waves, and a relative positional relation between the antenna and the test piece, the test piece is a device radiating the radiant interference wave measured in the radiant interference wave test conducted under pre-determined test conditions and test methods, and the plurality of electromagnetic wave sources are wave sources of the radiant interference wave.

7. The controlling method according to claim 6, wherein the measurement position calculating step calculates the plurality of measurement positions based on the positions of the plurality of electromagnetic wave sources, the relative positional relation, and a wave length of the radiant interference wave.

8. The controlling method according to claim 7, wherein the measurement position calculating step changes the plurality of calculated measurement positions such that all of the measurement intervals are equal to the upper limit value, in a case in which a maximum value of the measurement interval included in the plurality of calculated measurement positions exceeds the upper limit value, and does not change the plurality of calculated measurement positions, in a case in which maximum value of the measurement interval included in the plurality of calculated measurement positions do not exceed the upper limit value.

9. The controlling method according to claim 6, wherein the controlling method includes an intensity distribution calculating step that calculates at least one of a distribution of an electric field intensity of the radiant interference waves and a distribution of a magnetic field intensity of the radiant interference waves based on the upper limit value calculated by the measurement interval upper limit value calculating step.

10. The controlling method according to claim 6, wherein the controlling method includes:
a distribution acquiring step that acquires at least one of the distributions through a simulation or actual measurement; and
an interpolating step that interpolates at least one of the distributions using a low pass filter.

11. An information processing device for controlling a radiant interference wave measuring device including an antenna for measuring the radiant interference wave at each of a plurality of measurement position set on a virtual surface surrounding a test piece, wherein, the information processing device comprises:
a measurement interval upper limit value calculating unit configured to calculate a maximum allowable distance as a measurement interval, which is a distance between two spatially adjacent measurement positions in the plurality of measurement positions set on the virtual surface, as a upper limit value of the measurement interval, a measurement position calculating unit configured to calculate the plurality of measurement positions such that all of the measurement intervals do not exceed the upper limit value calculated by the measurement interval upper limit value calculating unit, a measurement position setting unit configured to set the plurality of measurement positions calculated by measurement position calculating unit on the virtual surface, a radiant interference wave measuring unit configured to control the radiant interference wave measuring device, and to measure the radiant interference wave at each of the plurality measurement positions set on the virtual surface by the measurement position setting unit, wherein the measurement interval upper limit value calculating unit calculates the upper limit value based on a positions of a plurality of electromagnetic wave sources according to the test piece radiating the radiant interference waves, and a relative positional relation between the antenna and the test piece, the test piece is a device radiating the radiant interference wave measured in the radiant interference wave test conducted under pre-determined test conditions and test methods, and the plurality of electromagnetic wave sources are wave sources of the radiant interference wave.

12. The information processing device according to claim 11, wherein the measurement position calculating unit calculates the plurality of measurement positions based on the positions of the plurality of electromagnetic wave sources, the relative positional relation, and a wave length of the radiant interference wave.

13. The information processing device according to claim 12, wherein the measurement position calculating unit changes the plurality of calculated measurement positions such that all of the measurement intervals are equal to the upper limit value, in a case in which a maximum value of the measurement interval included in the plurality of calculated measurement positions exceed the upper limit value, and does not change the plurality of calculated measurement positions, in a case in which maximum value of the measurement interval included in the plurality of calculated measurement positions not exceed the upper limit value.

14. The information processing device according to claim 11, wherein the information processing device comprises a intensity distribution calculating unit that calculates at least one of a distribution of an electric field intensity of the radiant interference waves and a distribution of a magnetic field intensity of the radiant interference waves based on the upper limit value calculated by the measurement interval upper limit value calculating unit.

15. The information processing device according to claim 14, wherein the information processing device comprises:
a distribution acquiring unit that acquires at least one of the distributions through a simulation or actual measurement; and
an interpolating unit that interpolates at least one of the distributions using a low pass filter.

* * * * *